US012413708B2

(12) United States Patent
Zhao et al.

(10) Patent No.: US 12,413,708 B2
(45) Date of Patent: Sep. 9, 2025

(54) ADAPTIVE LOCAL REFERENCE RANGE

(71) Applicant: TENCENT AMERICA LLC, Palo Alto, CA (US)

(72) Inventors: Xin Zhao, San Jose, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/622,821

(22) Filed: Mar. 29, 2024

(65) Prior Publication Data

US 2024/0244188 A1 Jul. 18, 2024

Related U.S. Application Data

(63) Continuation of application No. 17/893,877, filed on Aug. 23, 2022, now Pat. No. 11,979,560.
(Continued)

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/136* (2014.11);
(Continued)

(58) Field of Classification Search
CPC .. H04N 19/105; H04N 19/132; H04N 19/136; H04N 19/159; H04N 19/172;
(Continued)

(56) References Cited

U.S. PATENT DOCUMENTS 11,140,400 B2 10/2021 Nakagami
2016/0241875 A1* 8/2016 Wu .................. H04N 19/176
(Continued)

FOREIGN PATENT DOCUMENTS

WO 2020/185964 A1 9/2020
WO WO-2021004348 A1 * 1/2021 ........... H04N 19/105

OTHER PUBLICATIONS

Xu et al.; "Intra block copy in Versatile Video Coding with Reference Sample Memory Reuse", 2019 Picture coding symposium (PCS), IEEE, XP033688140, Nov. 12, 2019, 5 pages (Year: 2019).*

(Continued)

*Primary Examiner* — Dramos Kalapodas
(74) *Attorney, Agent, or Firm* — ArentFox Schiff LLP

(57) ABSTRACT

Aspects of the disclosure provide a method, an apparatus, and non-transitory computer-readable storage medium for video decoding. The apparatus includes processing circuitry configured to reconstruct an area in a block in a current picture from a coded video bitstream. The block includes one or more coding blocks (CBs) in the current picture. After the reconstructing, the processing circuitry determines whether to update a previous local reference range for an intra block copy (IBC) mode based on a content of the reconstructed area and/or prediction information of the reconstructed area. In response to a determination not to update the previous local reference range for the IBC mode, the previous local reference range for the IBC mode is not updated. The processing circuitry decodes a coding block in the current picture using the IBC mode that is based on the previous local reference range, which does not include the reconstructed area.

13 Claims, 24 Drawing Sheets

Related U.S. Application Data

(60) Provisional application No. 63/237,098, filed on Aug. 25, 2021.

(51) Int. Cl.
  *H04N 19/136* (2014.01)
  *H04N 19/159* (2014.01)
  *H04N 19/172* (2014.01)
  *H04N 19/176* (2014.01)
  *H04N 19/423* (2014.01)
  *H04N 19/463* (2014.01)
  *H04N 19/593* (2014.01)

(52) U.S. Cl.
  CPC ......... *H04N 19/159* (2014.11); *H04N 19/172* (2014.11); *H04N 19/176* (2014.11); *H04N 19/423* (2014.11); *H04N 19/463* (2014.11); *H04N 19/593* (2014.11)

(58) Field of Classification Search
  CPC .. H04N 19/176; H04N 19/423; H04N 19/463; H04N 19/593; H04N 19/14; H04N 19/57
  See application file for complete search history.

(56) References Cited

U.S. PATENT DOCUMENTS

| | | |
|---|---|---|
| 2016/0360210 A1 | 12/2016 | Xiu et al. |
| 2017/0302958 A1 | 10/2017 | Li et al. |
| 2020/0236384 A1 | 7/2020 | Xu et al. |
| 2020/0252621 A1* | 8/2020 | Xu ................... H04N 19/176 |
| 2021/0321092 A1* | 10/2021 | Zhang ............... H04N 19/517 |
| 2021/0321093 A1* | 10/2021 | Sundaram ......... H04N 19/593 |
| 2021/0368164 A1* | 11/2021 | Xu ................... H04N 19/105 |
| 2022/0078433 A1* | 3/2022 | Yoo ................. H04N 19/176 |
| 2022/0159295 A1 | 5/2022 | Xiu et al. |
| 2022/0312003 A1 | 9/2022 | Lee et al. |
| 2022/0353498 A1* | 11/2022 | Sundaram .......... H04N 19/182 |

OTHER PUBLICATIONS

Chen, et al., "An Overview of Core Coding Tools in the AV1 Video Codec", 2018 Picture Coding Symposium (PCS), Sep. 6, 2018, pp. 41-45.

International Search Report and Written Opinion received for PCT Patent Application No. PCT/US2022/075402, mailed on Nov. 23, 2022, 8 pages.

Jiahao Li, et al., Intra Block Copy for Screen Content in the Emerging AV1 Video Codec, 2018 Data Compression Conference, Jul. 23, 2018, pp. 355-364.

Nguyen, et al., "Overview of the Screen Content Support in VVC: Applications, Coding Tools, and Performance", IEEE Transactions on Circuits and Systems for Video Technology, vol. 31, No. 10, Apr. 21, 2021, pp. 3801-3817.

Office Action received for Japanese Patent Application No. 2023-5321507, mailed on Mar. 6, 2024, 12 pages (7 pages of English Translation and 5 pages of Original Document).

Rivaz et al., "AV1 Bitstream & Decoding Process Specification", The Alliance for Open Media 681, Jan. 8, 2019, pp. 1-681.

Wang, et al., "IntraBC with Local Reference Ranges, Alliance for Open Media Codec Working Group", Document: CWG-B071[i]_v1, Aug. 18, 2021, pp. 1-6.

Extended European Search Report and Search Opinion received for European Application No. 22859542.7, mailed on Nov. 13, 2024, 11 pages.

Tsang et al., "Hash Based Fast Local Search for Intra Block Copy (IntraBC) Mode in HEVC Screen Content Coding", Proceedings of APSIPA Annual Summit and Conference 2015, XP032870573, Dec. 16-19, 2015, pp. 396-400.

Xu et al., "Intra block copy in Versatile Video Coding with Reference Sample Memory Reuse", 2019 Picture coding symposium (PCS), IEEE, XP033688140, Nov. 12, 2019, 5 pages.

\* cited by examiner

FIG. 14A (a) horizontal split

FIG. 14B (b) vertical split

ADAPTIVE LOCAL REFERENCE RANGE

INCORPORATION BY REFERENCE

The present disclosure is a continuation of U.S. application Ser. No. 17/893,877, "INTRA BLOCK COPY WITH AN ADAPTIVE LOCAL REFERENCE RANGE" filed on Aug. 23, 2022, which claims the benefit of priority to U.S. Provisional Application No. 63/237,098, "INTRABC WITH ADAPTIVE LOCAL REFERENCE RANGE" filed on Aug. 25, 2021. The above-listed application disclosures are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image and/or video coding and decoding can be performed using inter-picture prediction with motion compensation. Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/ HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding and decoding. In some examples, an apparatus for video decoding includes processing circuitry. The processing circuitry is configured to reconstruct an area in a block in a current picture from a coded video bitstream. The block includes one or more coding blocks (CBs) in the current picture. After the reconstructing, the processing circuitry can determine whether to update a previous local reference range for an intra block copy (IBC) mode based on (i) a content of the reconstructed area and/or (ii) prediction information of the reconstructed area. In response to a determination not to update the previous local reference range for the IBC mode, the previous local reference range for the IBC mode is not updated and the processing circuitry decodes a coding block (CB) in the current picture using the IBC mode that is based on the previous local reference range, which does not include the reconstructed area.

In an embodiment, the processing circuitry determines the content of the reconstructed area based on reconstructed samples in the reconstructed area where the content of the reconstructed area indicates a percentage of a texture content and/or a percentage of a screen content in the reconstructed area. The processing circuitry can determine whether to update the previous local reference range for the IBC mode based on the percentage of the texture content and/or the percentage of the screen content in the reconstructed area. In an example, the content of the reconstructed area includes no screen content, and the processing circuitry determines that the previous local reference range for the IBC mode is not to be updated.

In an embodiment, the processing circuitry decodes the prediction information of the area, which indicates a prediction mode of the area and determines whether to update the previous local reference range for the IBC mode based on whether the prediction mode is in a set of pre-defined prediction modes.

In an embodiment, the processing circuitry decodes the prediction information of the area, which indicates whether to update the previous local reference range with reconstructed samples in the reconstructed area. The processing circuitry determines whether to update the previous local reference range for the IBC mode based on the indication, in the prediction information, of whether to update the previous local reference range with the reconstructed samples in the reconstructed area.

In an example, whether to update the previous local reference range with the reconstructed samples in the reconstructed area is indicated by a flag included in the prediction information of the area, and the processing circuitry determines whether to update the previous local reference range for the IBC mode based on the flag. In an example, the flag indicates whether any reconstructed samples in the block are to be used in updating the local reference range in the IBC mode.

In an embodiment, the previous local reference range for the IBC mode is determined to be updated, and the previous local reference range includes multiple areas stored in a reference sample memory (RSM). The multiple areas can include reference samples. The processing circuitry can rank the multiple areas based on contents of the multiple areas where each of the contents corresponds to a respective one of the multiple areas. The processing circuitry can select an area in the multiple areas to be replaced by reconstructed samples in the reconstructed area based on the ranking of the multiple areas and generate a current local reference range by replacing the selected area in the previous local reference range with the reconstructed samples in the reconstructed area.

In an example, each of the contents corresponds to the respective one of the multiple areas is indicated by a percentage of a screen content or a percentage of a texture content in the corresponding area. The processing circuitry ranks the multiple areas based on the respective percentages of the screen contents or the respective percentages of the texture contents of the multiple areas.

In an embodiment, the previous local reference range for the IBC mode is determined to be updated, and the previous local reference range includes multiple areas stored in an RSM. Each area of the multiple areas includes a number of specially coded reference samples in the respective area that are coded with one or more prediction modes in a set of pre-defined prediction modes. The processing circuitry can rank the multiple areas based on the respective numbers of specially coded reference samples in the multiple areas. The processing circuitry can select an area in the multiple areas to be replaced by reconstructed samples in the reconstructed area based on the ranking of the multiple areas and generate a current local reference range by replacing the selected area in the previous local reference range with the reconstructed samples in the reconstructed area.

In an embodiment, the previous local reference range for the IBC mode is determined to be updated, and the previous local reference range includes multiple areas stored in an RSM. A reference frequency associated with each area of the multiple areas indicates a number of times that the respective area is referenced by block vectors used to predict CBs in the current picture. The processing circuitry can rank the multiple areas based on the respective reference frequencies of the multiple areas. The processing circuitry can select an area in the multiple areas to be replaced by reconstructed samples in the reconstructed area based on the ranking of the multiple areas and generate a current local reference range by replacing the selected area in the previous local reference range with the reconstructed samples in the reconstructed area.

In an embodiment, the previous local reference range includes multiple areas. Reconstructed samples of the multiple areas except reconstructed samples of a sub-area in one of the multiple areas are stored in an RSM. The reconstructed samples of the sub-area in the one of the multiple areas are replaced by a padding process that stores padded samples corresponding to the sub-area in the one of the multiple areas in the RSM.

In an embodiment, the reconstructed area is a reconstructed coding block, or a size of the reconstructed area is a size of a memory update area unit.

Aspects of the disclosure also provide a non-transitory computer-readable storage medium storing a program executable by at least one processor to perform the methods for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Overview of Video/Image Coding Technologies

Figure 1A:
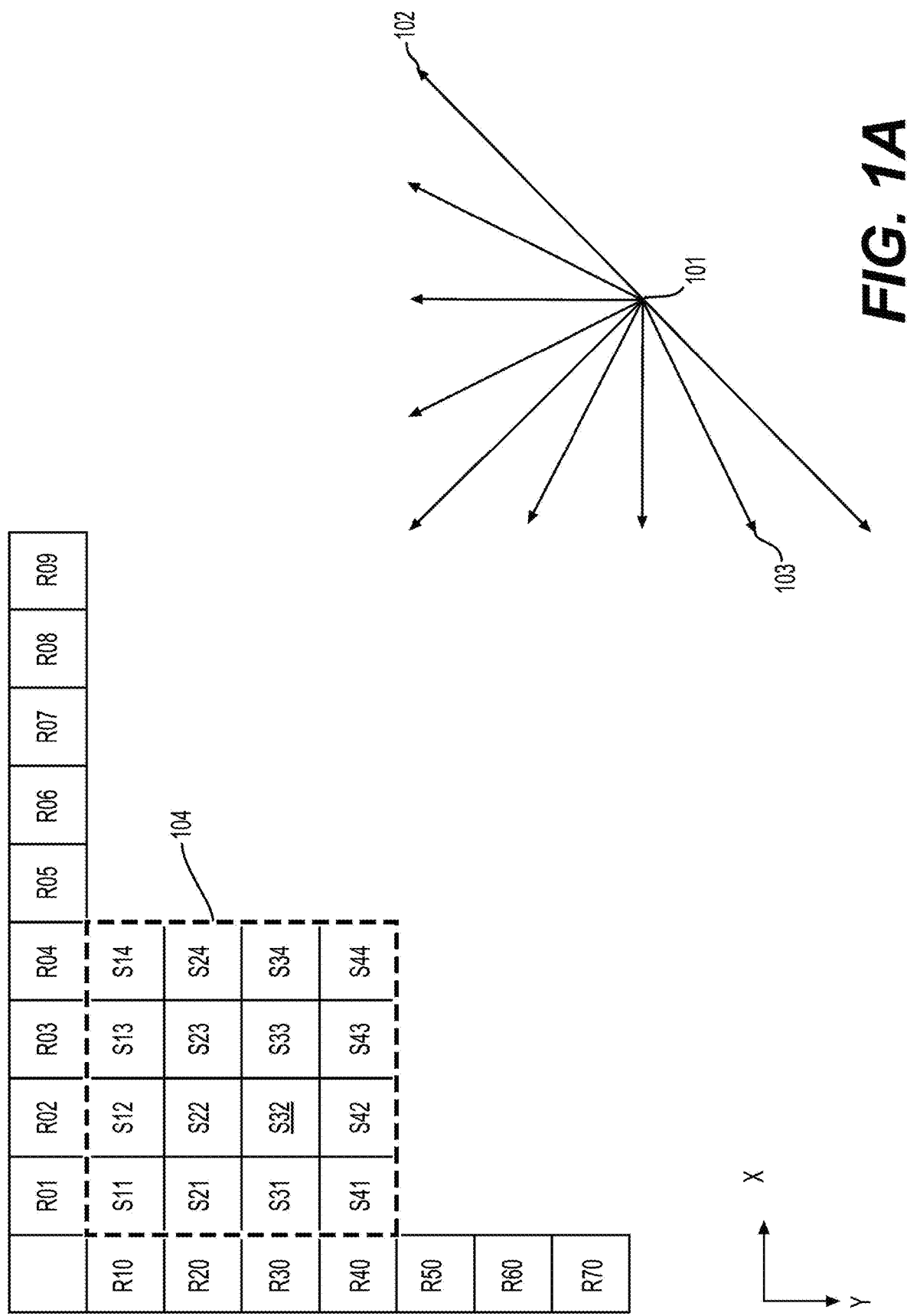
FIG. 1A is a schematic illustration of an exemplary subset of intra prediction modes.
Figure 1B:
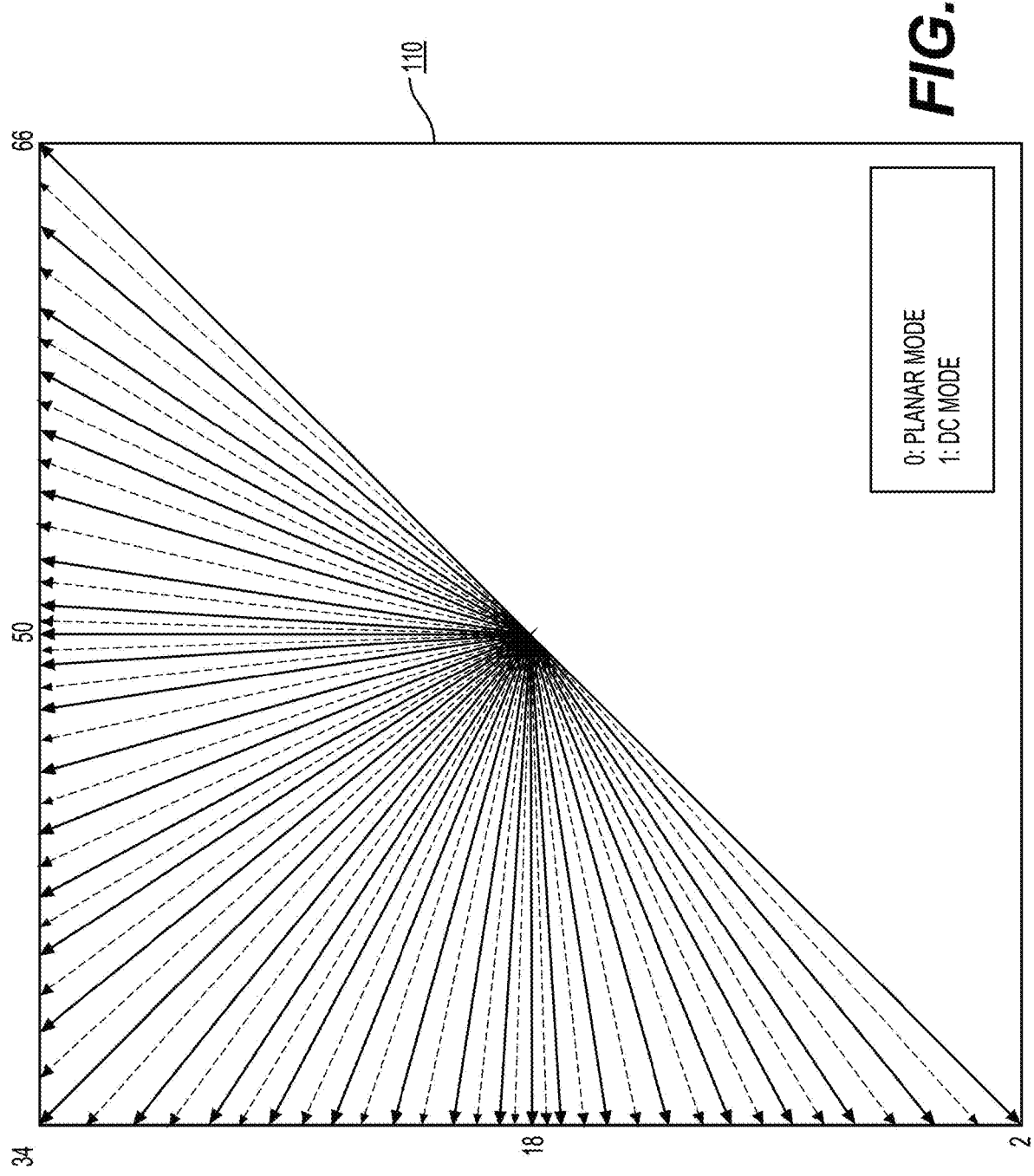
FIG. 1B is an illustration of exemplary intra prediction directions.
Figure 2:
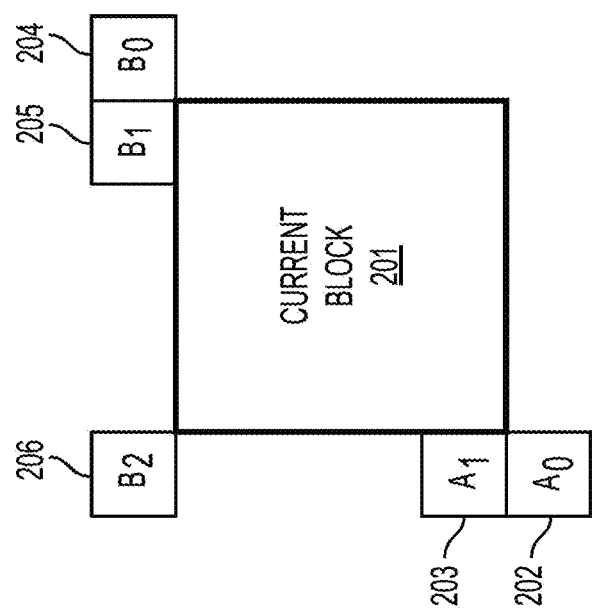
FIG. 2 shows an example of a current block (201) and surrounding samples.
Figure 3:
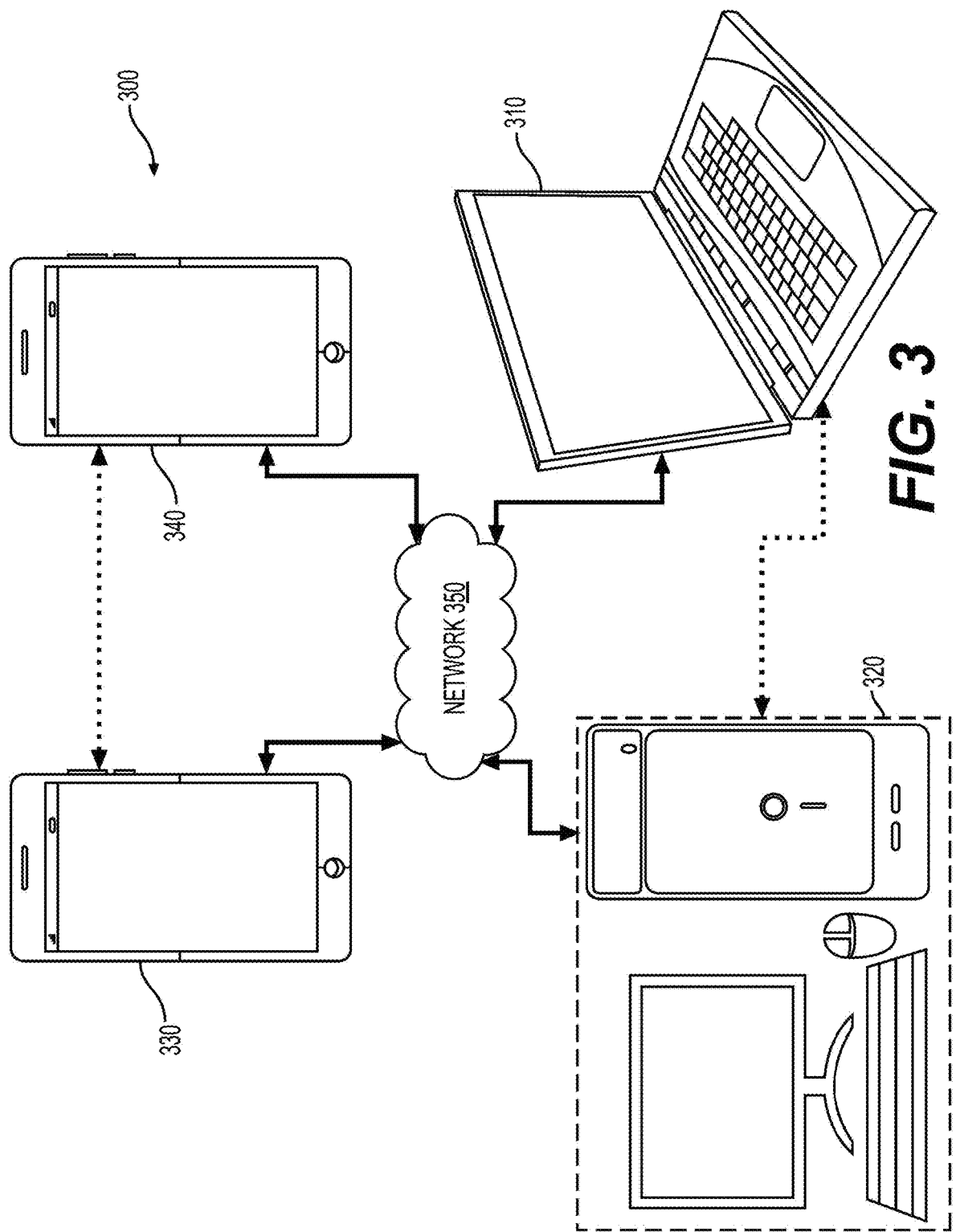
FIG. 3 is a schematic illustration of an exemplary block diagram of a communication system (300).

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
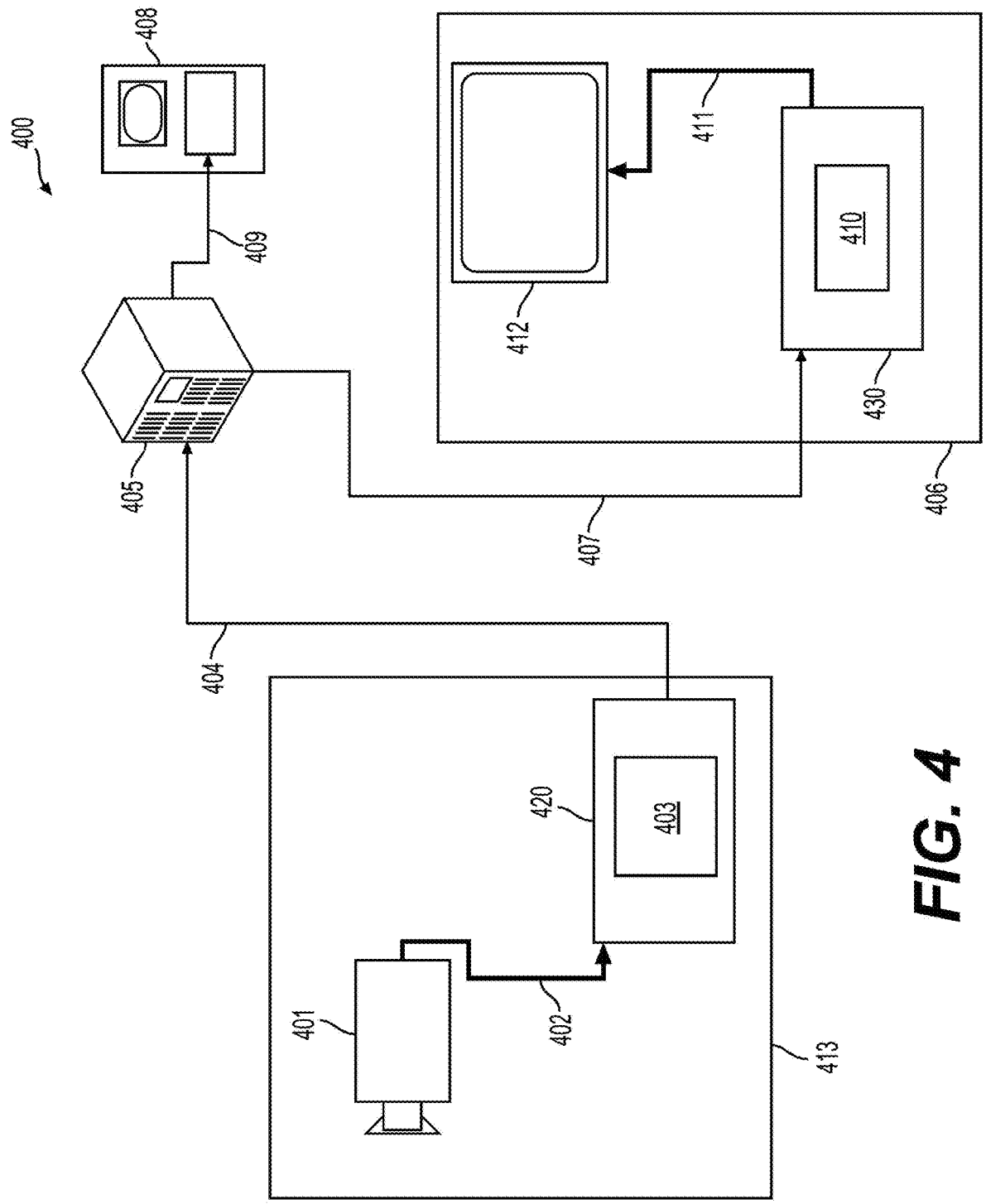
FIG. 4 is a schematic illustration of an exemplary block diagram of a communication system (400).

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
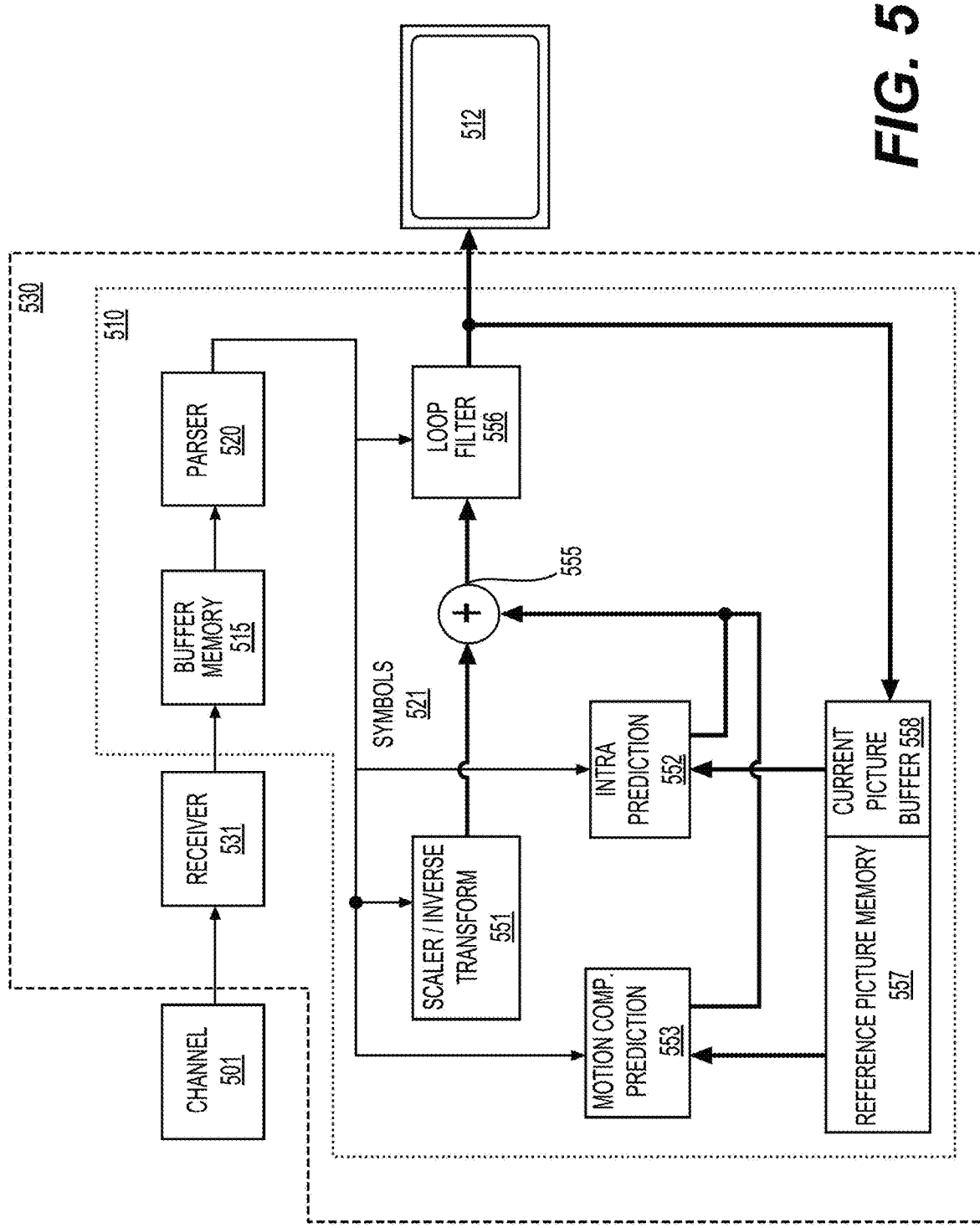
FIG. 5 is a schematic illustration of an exemplary block diagram of a decoder.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
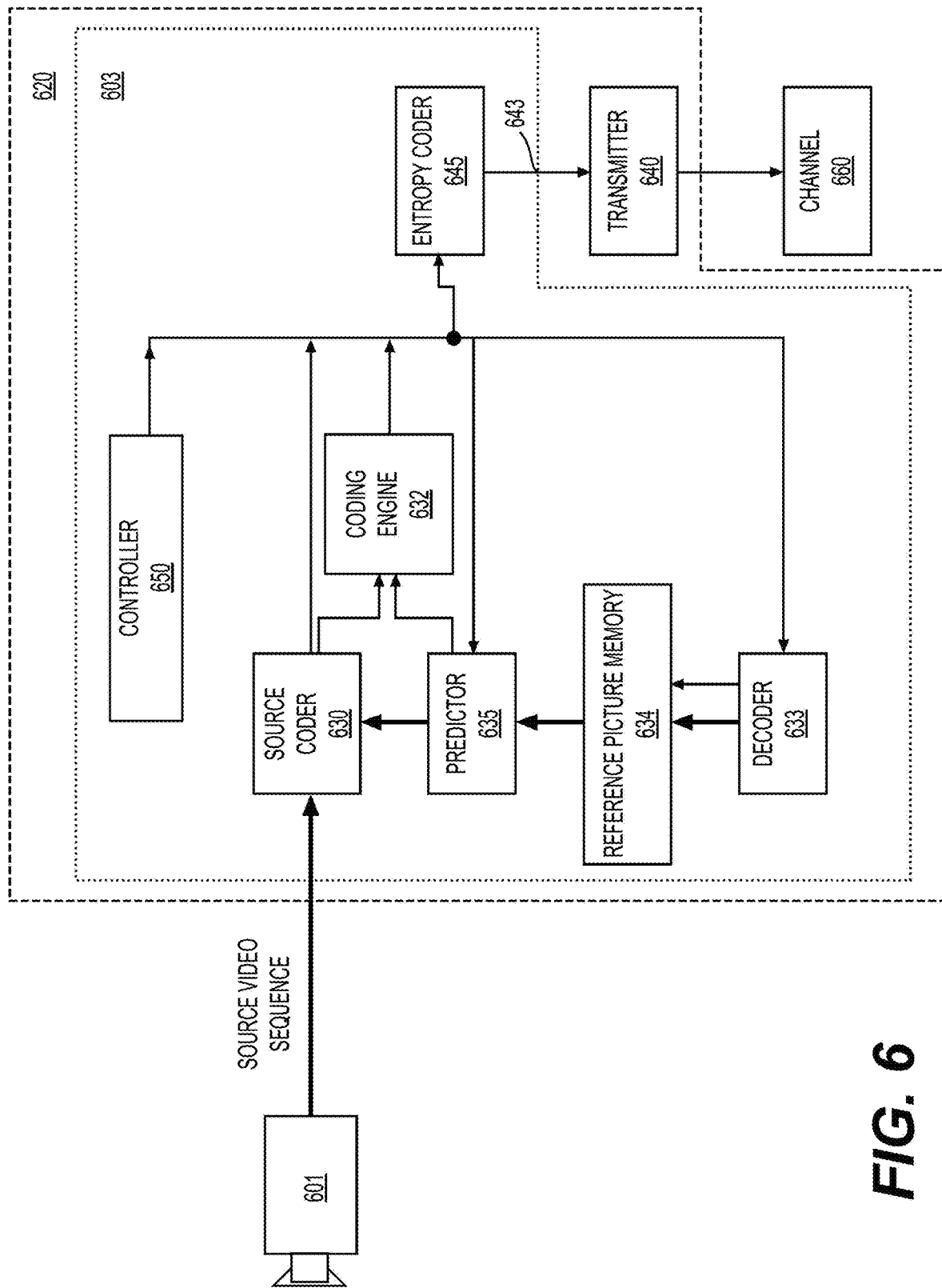
FIG. 6 is a schematic illustration of an exemplary block diagram of an encoder.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB) and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
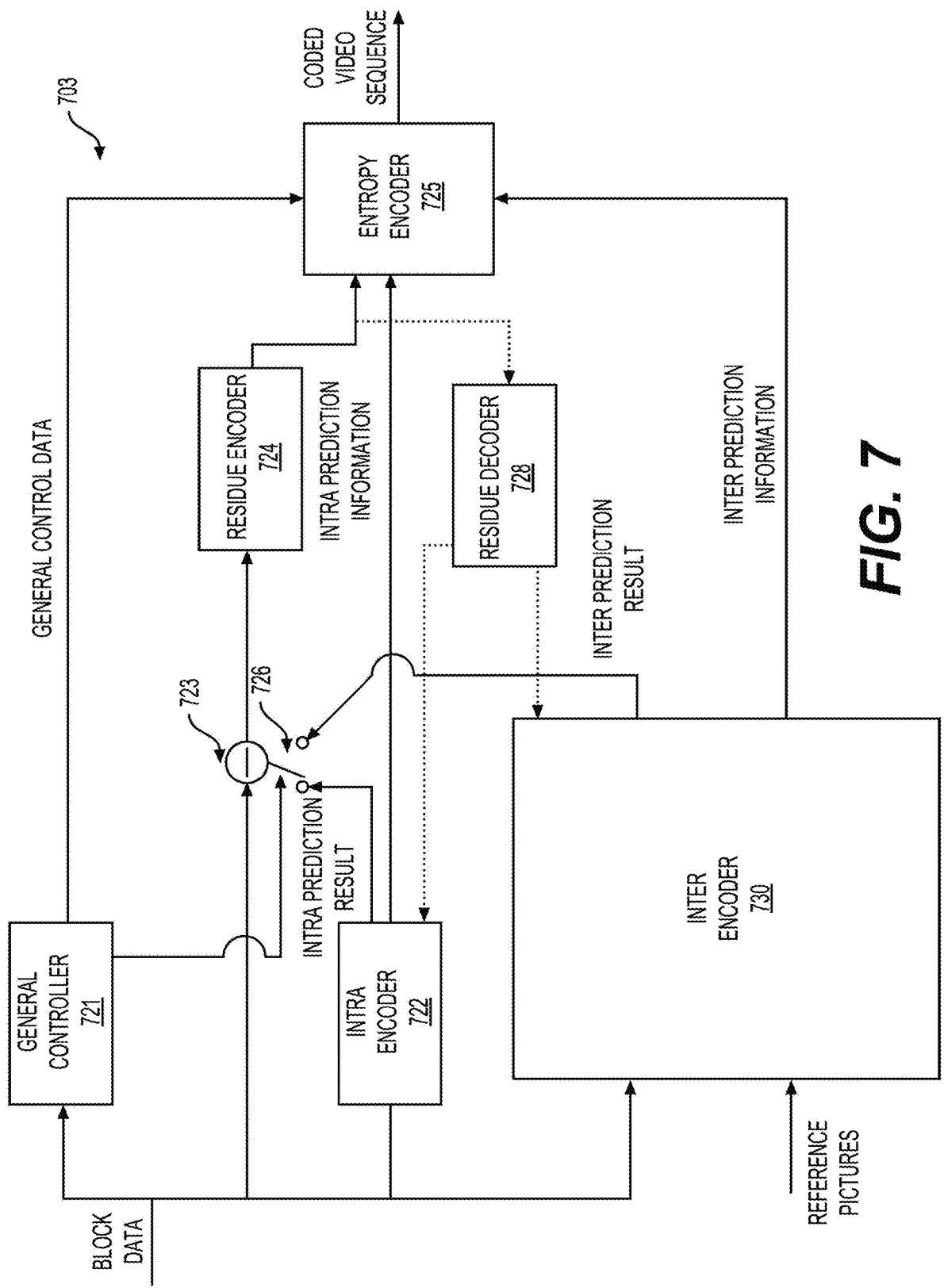
FIG. 7 shows a block diagram of an exemplary encoder.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
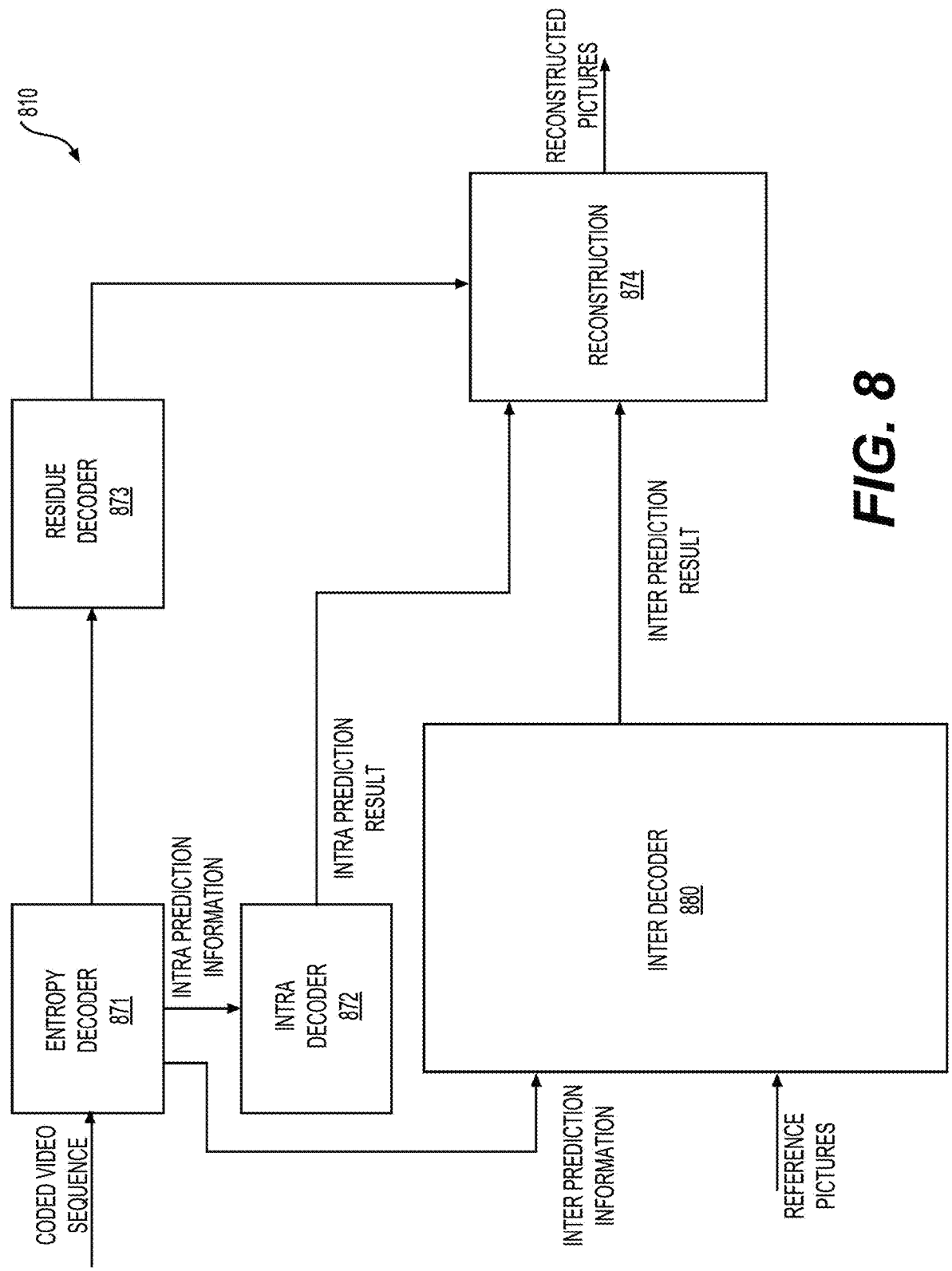
FIG. 8 shows a block diagram of an exemplary decoder.

FIG. 8 shows an exemplary diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

II. An Intra Block Copy (IBC or IntraBC) Mode

The disclosure describes advanced video/image coding technologies that are related to an intra block copy mode with a local reference range.

II.1 IBC Mode in HEVC and VVC

II.1.1 Current Picture Referencing (CPR) in HEVC

The IBC coding tool can be used in the HEVC Screen Content Coding (SCC) extensions as CPR. The IBC mode can use coding technologies that are used for inter prediction where a current picture is used as a reference picture in the IBC mode. A benefit of using the IBC mode is a referencing structure of the IBC mode where a two-dimensional (2D) spatial vector can be used as the representation of an addressing mechanism to reference samples. A benefit of an architecture of the IBC mode is that the integration of IBC requires relatively minor changes to the specification and can ease the implementation burden if manufacturers have already implemented certain inter prediction technologies, such as the HEVC version 1. CPR in the HEVC SCC extensions can be a special inter prediction mode, resulting in a same syntax structure as the syntax structure of the inter prediction mode and a decoding process that is similar to a decoding process of the inter prediction mode.

The IBC mode can be integrated into the inter prediction process. In some examples, the IBC mode (or CPR) is an inter prediction mode, and an intra-only predicted slice is to become a predicted slice to allow the usage of the IBC mode. When the IBC mode is applicable, a coder can extend a reference picture list by one entry for a pointer to point to the current picture. For example, the current picture uses a one picture-sized buffer of a shared decoded picture buffer (DPB). The IBC mode signaling can be implicit. For example, when the selected reference picture points to the current picture, a CU can employ the IBC mode. In various embodiments, reference samples used in the IBC process are not filtered, which is different from a regular inter prediction. The corresponding reference picture used in the IBC process is a long-term reference. To minimize the memory requirement, the coder can release the buffer after reconstructing the current picture, for example, the coder immediately releases the buffer after reconstructing the current picture. A filtered version of the reconstructed picture can be put back into the DPB by the coder as a short-term reference when the reconstructed picture is a reference picture.

In block vector (BV) coding, referencing to a reconstructed area can be performed via a 2D BV which is similar in inter prediction. Prediction and coding of a BV can reuse MV prediction and coding in the inter prediction process. In an example, a luma BV is in an integer resolution rather than a ¼-th precision of a MV as used for a regular inter coded CTU.

Figure 9:
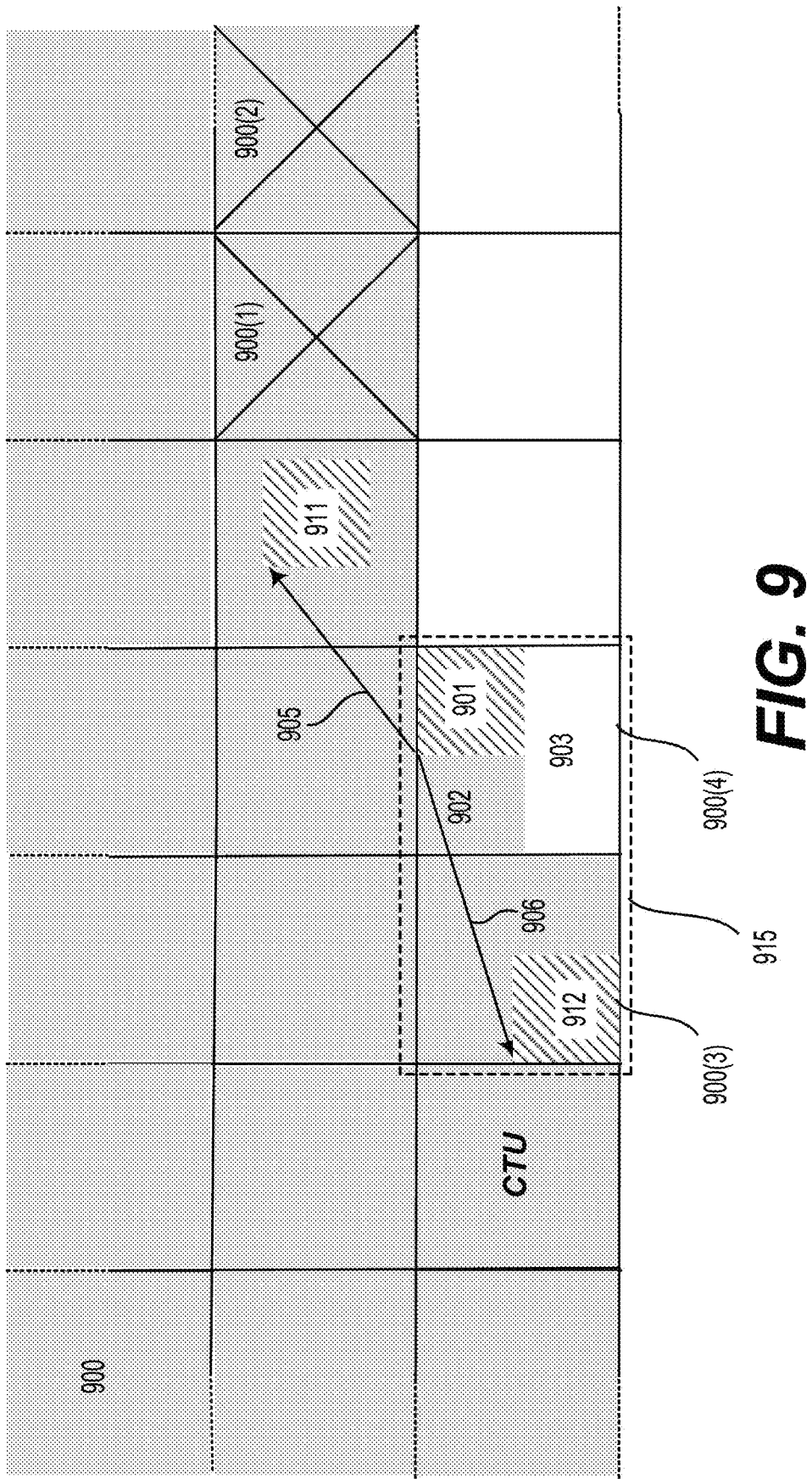
FIG. 9 shows block vectors associated with a current coding unit according to embodiments of the disclosure.

FIG. 9 shows BVs associated with a current CU (901) according to embodiments of the disclosure. Each square (900) can represent a CTU. A gray-shaded area represents an already coded area (e.g., an already encoded area), and a white, non-shaded area represents an area to be coded (e.g., an area to be encoded). A current CTU (900(4)) that is under reconstruction includes the current CU (901), a coded area (902), and an area (903) to be coded. In an example, the area (903) will be coded after coding the current CU (901).

In an example, such as in HEVC, the gray-shaded area except for the two CTUs (900(1)-900(2)) that are on the right above the current CTU (900(4)) can be used as a reference area in the IBC mode to allow a Wavefront Parallel Processing (WPP). A BV that is allowed in HEVC can point to a block that is within the reference area (e.g., the gray-shaded area excluding the two CTUs (900(1)-900(2))). For example, a BV (905) that is allowed in HEVC points to a reference block (911).

In an example, such as in VVC, in addition to the current CTU (900(4)), only the left neighboring CTU (900(3)) to the left of the current CTU (900(4)) is allowed as a reference area in the IBC mode. In an example, the reference area used in the IBC mode in VVC is within a dotted area (915) and includes samples that are coded. For example, a BV (906) that is allowed in VVC points to a reference block (912).

In some examples, a decoded motion vector difference (MVD) (also referred to as a BV difference (BVD)) of a BV can be left-shifted by two before adding to a corresponding BV predictor to reconstruct a final BV.

In some embodiments, special handling of the IBC mode may be necessary for implementation and performance reasons, and the IBC mode and the inter prediction mode (e.g., the regular inter prediction mode) can differ, such as described below. In an example, reference samples used in the IBC mode are unfiltered (e.g., reconstructed samples before in-loop filtering processes, such as a DBF and a sample adaptive offset (SAO) filter are applied). Other inter prediction modes (e.g., the regular inter prediction mode) of HEVC can use filtered samples, for example, reference samples that are filtered by the in-loop filtering processes.

In some examples, luma sample interpolation is not performed in the IBC mode. Chroma sample interpolation can be performed in the IBC mode. In some examples, chroma sample interpolation is only necessary when a chroma BV is a non-integer when the chroma BV is derived from a corresponding luma BV. In some examples, luma sample interpolation and chroma samples interpolation can be performed in the regular inter prediction mode.

In the IBC mode, a special case can occur when a chroma BV is a non-integer BV and a reference block is near a boundary of an available area (e.g., a reference area). For example, surrounding reconstructed samples can be outside the boundary to perform the chroma interpolation. In an example, a BV pointing to a single next-to-border line may result in the surrounding reconstructed samples being outside the boundary.

II.1.2 An IBC Architecture in VVC

An effective reference area for the IBC mode in the HEVC SCC extensions can include an entire already reconstructed area of a current picture with some exceptions for parallel processing purposes, such as described in FIG. 9. A drawback of the reference area used in HEVC can include a requirement for additional memory in the DPB, for which hardware implementations may employ external memory. An additional access to the external memory can increase a memory bandwidth, and using the DPB can be less attractive. In some embodiments, a fixed memory (e.g., a memory having a fixed size) that can be realized on-chip for the IBC mode can be used in VVC. The on-chip fixed memory in the IBC mode can significantly decrease the complexity of implementing the IBC mode in hardware architectures. In an example, the on-chip fixed memory in the IBC mode can decrease a latency. In some examples, a modification addresses a signaling concept that is departed from the integration within the inter prediction process as in the HEVC SCC extensions.

In examples shown in FIGS. 10A-10D, a fixed memory can be allocated to store a reference area used in the IBC mode. The fixed memory can be referred to as a reference sample memory (RSM). A portion of the RSM can be updated at different intermediate times during a coding process (e.g., an encoding process or a reconstruction process). FIGS. 10A-10D show an RSM update process at various intermediate times during the coding process (e.g., the encoding process or the reconstruction process) according to embodiments of the disclosure. FIGS. 10A-10D show reference areas for the IBC mode in VVC and configurations in VVC.

Referring to FIGS. 10A-10D, a current CTU (1020) is adjacent to a CTU (e.g., a left neighboring CTU) (1010) that is to the left of the current CTU (1020). In some examples, the current CTU (1020) includes four areas (1021)-(1024). The left neighboring CTU (1010) can include four areas (1011)-(1014) that correspond to the areas (1021)-(1024), respectively. Positions of the areas (1011)-(1014) are left-shifted by a width of the CTU (1020) from positions of the areas (1021)-(1024), respectively. The RSM can include a portion of the current CTU (1020) and/or a portion of the left neighboring CTU (1010). In the examples shown in FIGS. 10A-10D, a size of the RSM is equal to a size of the CTU. Light-gray shaded areas can include reference samples of the left neighboring CTU (1010), dark-gray shaded areas can include reference samples of the current CTU (1020), and white, non-shaded areas can represent areas to be coded (e.g., upcoming coding areas).

Figure 10A:
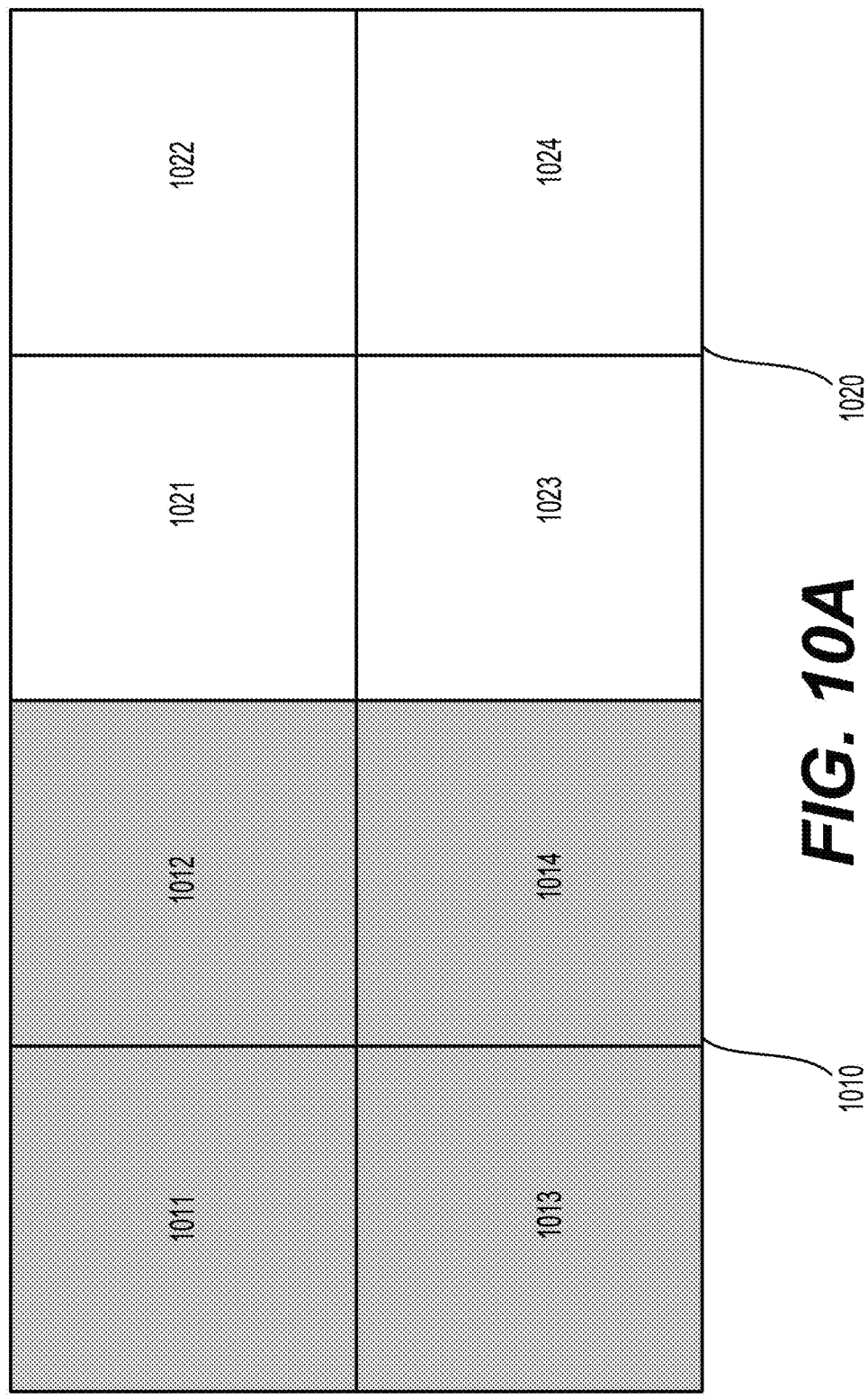
FIGS. 10A-10D show reference areas for an intra block copy (IBC) mode according to embodiments of the disclosure.

Referring to FIG. 10A, at a first intermediate time of the coding process that is a beginning of the coding process of the current CTU (1020), the RSM includes the entire left neighboring CTU (1010), and the entire left neighboring CTU (1010) can serve as the reference area in the IBC mode at the beginning of the coding process of the current CTU (1020). The RSM at the beginning of the coding process of the current CTU (1020) includes none of the areas (1021)-(1024).

Figure 10B:
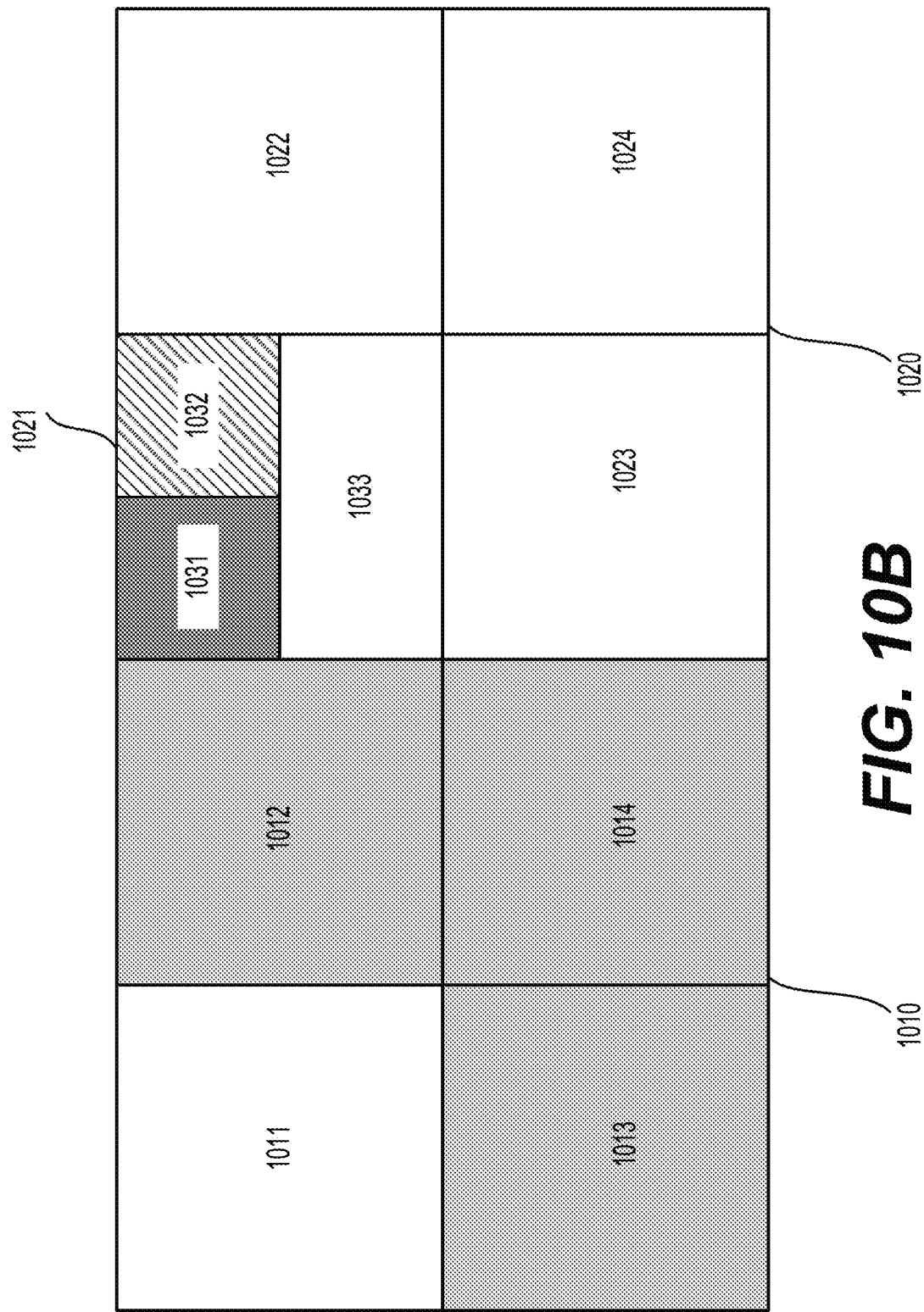

Referring to FIG. 10B, the area (1021) includes sub-areas (1031)-(1033). The sub-area (1031) is already coded (e.g., encoded or reconstructed), the sub-area (1032) is a current CU that is being coded (e.g., being encoded or under reconstruction), and the sub-area (1033) is to be coded subsequently. At a second intermediate time of the coding process of the current CTU (1020) where the sub-area (1032) of the current CTU (1020) is being coded, the RSM is updated to include a portion of the left neighboring CTU (1010) and a portion of the current CTU (1020). For example, the RSM includes the areas (1012)-(1014) of the left neighboring CTU (1010) and the sub-area (1031) of the current CTU (1020). The reference area at the second intermediate time can include the areas (1012)-(1014) of the left neighboring CTU (1010) and the sub-area (1031) of the current CTU (1020).

Figure 10C:

Referring to FIG. 10C, the area (1022) includes sub-areas (1041)-(1043). The sub-area (1041) (in dark-gray shading) is already coded (e.g., encoded or reconstructed), the sub-area (1042) is a current CU that is being coded (e.g., being encoded or under reconstruction), and the sub-area (1043) (in white color) is to be coded subsequently. At a third intermediate time of the coding process of the current CTU (1020) where the sub-area (1042) of the current CTU (1020) is being coded, the RSM is updated to include (i) the areas (1013)-(1014) of the left neighboring CTU (1010) and (ii) the area (1021) and the sub-area (1041) of the current CTU (1020). In the RSM, the area (1012) is replaced by the sub-area (1041). The reference area at the third intermediate time can include (i) the areas (1013)-(1014) of the left neighboring CTU (1010) and (ii) the area (1021) and the sub-area (1041) of the current CTU (1020).

Figure 10D:
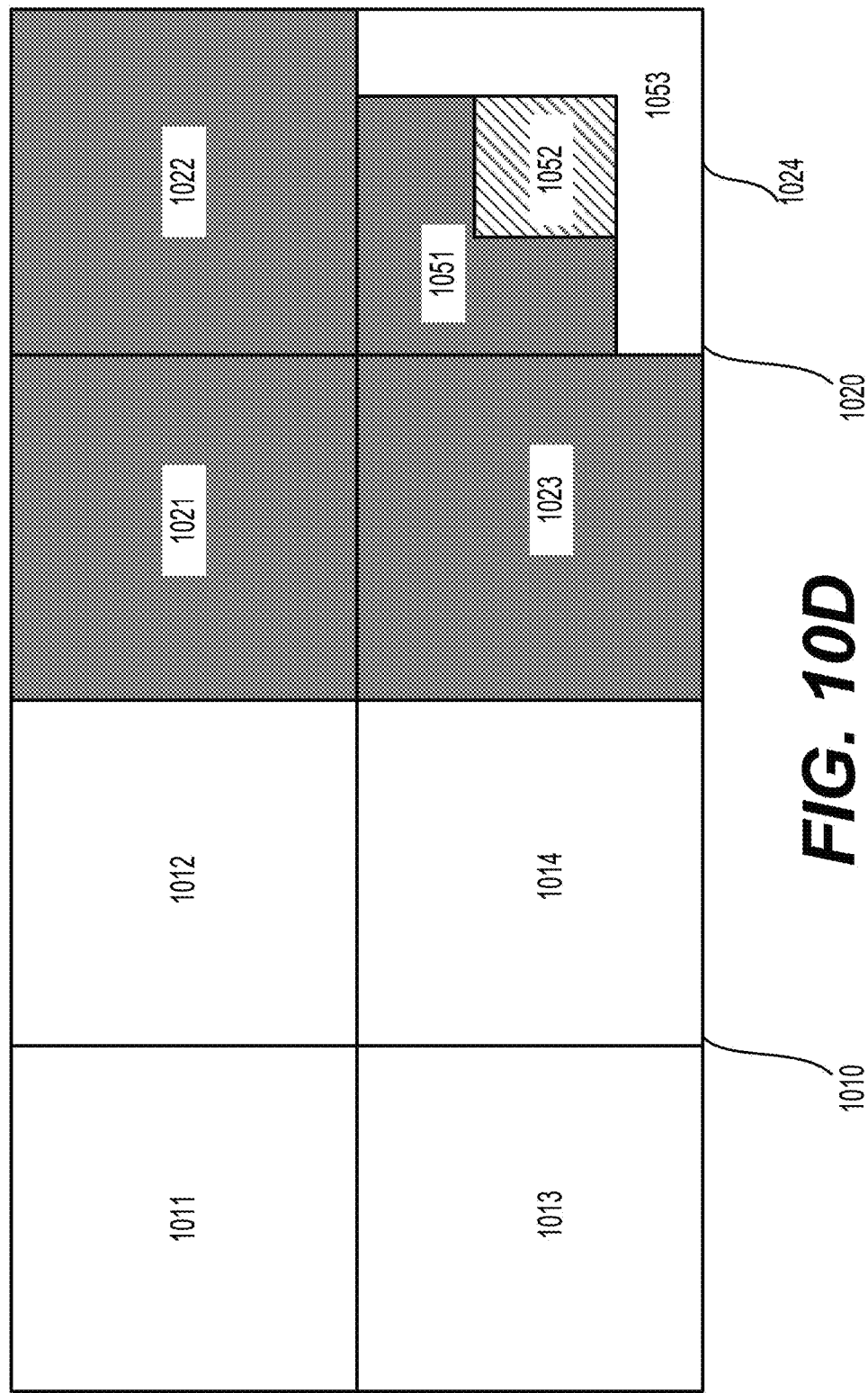

Referring to FIG. 10D, the area (1024) includes sub-areas (1051)-(1053). The sub-area (1051) (in dark-gray shading) is already coded (e.g., encoded or reconstructed), the sub-area (1052) is a current CU that is being coded (e.g., being encoded or under reconstruction), and the sub-area (1053) (in white color) is to be coded subsequently. At a fourth intermediate time of the coding process of the current CTU (1020) where the sub-area (1052) of the current CTU (1020) is being coded, the RSM is updated to include the areas (1021)-(1023) and the sub-area (1051) of the current CTU (1020). The RSM at the fourth intermediate time includes no areas in the left neighboring CTU (1010). The reference area at the fourth intermediate time can include the areas (1021)-(1023) and the sub-area (1051) of the current CTU (1020).

II.1.3 Syntax and Semantics of the IBC Mode in VVC

The IBC architecture in VVC can form a dedicated coding mode where the IBC mode is the third prediction mode in addition to the intra prediction mode and the inter prediction mode (e.g., the regular inter prediction mode). A bitstream can include an IBC syntax element indicating the IBC mode for a CU, for example, when a size of the CU is equal to or less than 64×64. In some examples, the largest CU size that can utilize the IBC mode is 64×64 to realize a continuous memory update mechanism of the RSM, such as described with references to FIGS. 10A-10D. In an example, a reference sample addressing mechanism remains identical to that used in the HEVC SCC extensions by denoting a 2D offset and reusing a vector (e.g., an MV) coding process of the inter prediction mode. In an example, when the CST is active, a coder cannot derive a chroma BV from a corresponding luma BV, resulting in the usage of the IBC mode only for a luma CB.

II.1.4 A Reference Area and Sample Memory of the IBC Mode in VVC

The IBC design in VVC can employ a fixed memory size (e.g., 128×128) for each color component to store reference samples. As described above, the fixed memory size can enable an on-chip placement of the memory (e.g., the RSM) in hardware implementations. In an example, such as in VVC, the maximum CTU size and the fixed memory size for the IBC mode are 128×128. In an example, the RSM includes samples of a single CTU when the maximum CTU size configuration is equal to the fixed memory size for the IBC mode (e.g., 128×128).

A feature of the RSM is the continuous update mechanism to replace reconstructed samples of a left neighboring CTU with reconstructed samples of a current CTU, such as described in FIGS. 10A-10D. FIGS. 10A-10D show simplified RSM examples for the update mechanism at the four intermediate times during the coding process (e.g., the reconstruction process). The light-gray shaded area in FIGS. 10A-10C can include the reference samples of the left neighboring CTU (1010), and the dark-gray shaded area in FIGS. 10B-10D can include the reference samples of the current CTU (1020). Referring to FIG. 10A, at the first intermediate time that represents the beginning of coding (e.g., encoding or reconstruction) of the current CTU (1020), the RSM consists of the reference samples of the left neighboring CTU (1010) only. In the other three intermediate times shown in FIGS. 10B-10D, the coding process (e.g., the encoding process or the reconstruction process) has replaced samples of the left neighboring CTU (1010) with samples in the current CTU (1020).

Figure 11:
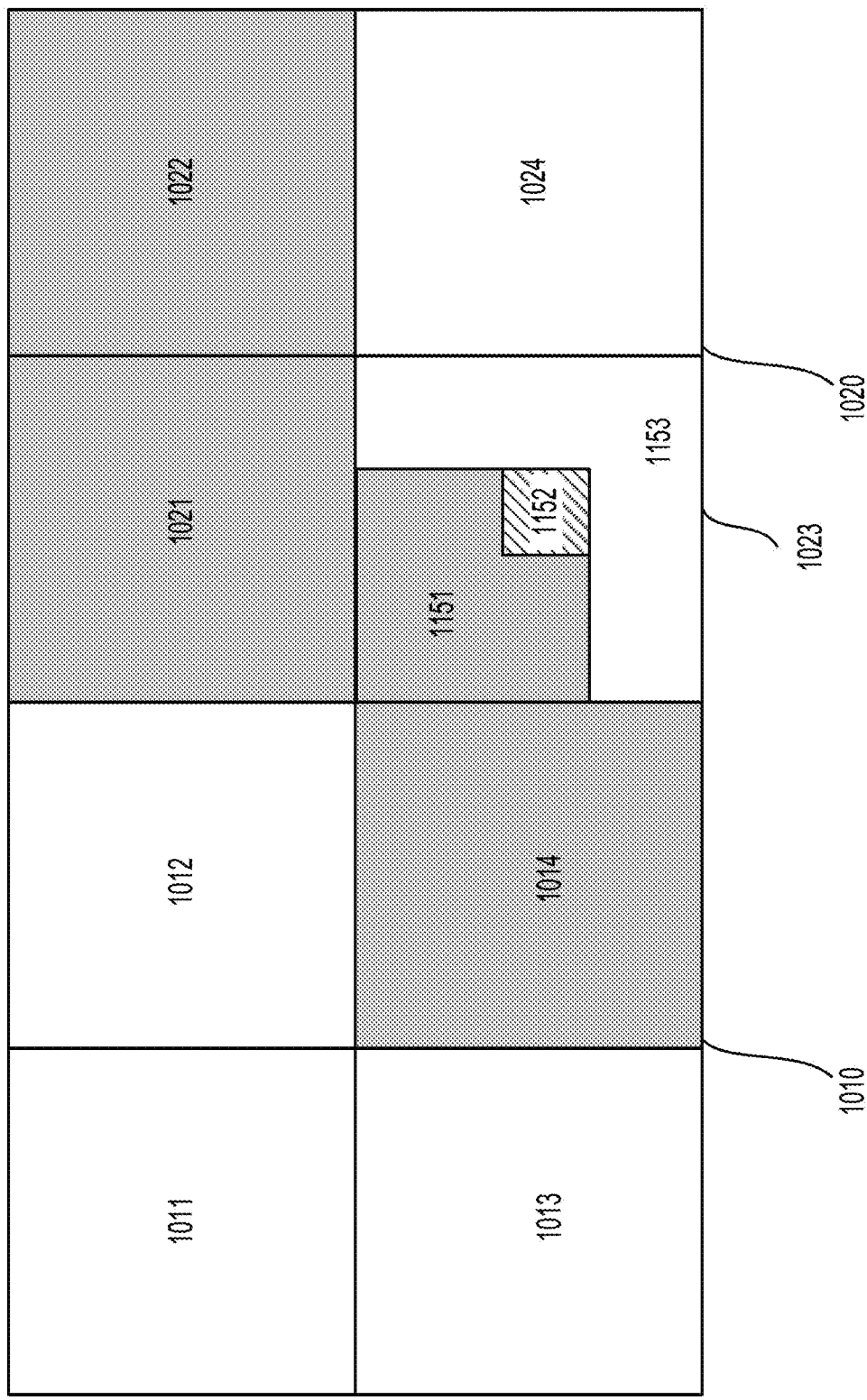
FIG. 11 shows an exemplary continuous update process of a reference sample memory (RSM) spatially.

In some examples, the RSM is implicitly divided into four areas, such as four disjoint areas of 64×64. A reset of an area in the RSM can occur when a coder processes the first CU that is in a corresponding area in a current CTU, easing the hardware implementation efforts. For example, the RSM is mapped to areas in CTU(s) (e.g., a left neighboring CTU and the current CTU). FIG. 11 shows a continuous update process (1100) of the RSM spatially. The left neighboring CTU (1010) and the current CTU (1020) are described in FIGS. 10A-10D. The left neighboring CTU (1010) can include the areas (1011)-(1014). The current CTU (1020) can include the areas (1021)-(1024). The area (1023) in the current CTU (1020) includes a current CU (1152) that is being coded, a sub-area (1151) that is already coded, a sub-area (1153) that is to be coded. Gray shaded areas can include samples stored in the RSM, and the white, non-shaded areas can include replaced samples or uncoded samples (e.g., unreconstructed samples).

At a coding time (e.g., a reconstruction time) shown in FIG. 11, the RSM update process has replaced samples covered by the white, non-shaded areas (e.g., the areas (1011)-(1013)) in the left neighboring CTU (1010) with the gray-shaded areas (e.g., the areas (1021)-(1022) and the sub-area (1151)) of the current CTU (1020). In FIG. 11, the RSM can include (i) the area (1014) in the left neighboring CTU (1010) and (ii) the areas (1021)-(1022) and the sub-area (1051) of the current CTU (1020).

In some examples, the RSM may include more than a single left neighboring CTU when the maximum CTU size is less than the RSM size (e.g., 128×128), and multiple neighboring CTUs can be used as the reference area in the IBC mode. For example, when the maximum CTU size is equal to 32×32, the RSM having a size of 128×128 can include samples of 15 neighboring CTUs.

II.1.5 BV Coding of the IBC Mode in VVC

The BV coding can employ processes specified for the inter prediction (e.g., the regular inter prediction). The BV coding can employ rules that are simpler than rules used in the inter prediction (e.g., the regular inter prediction) to construct a candidate list.

For example, a candidate list for the inter prediction includes five spatial candidates, one temporal candidate, and six history-based candidates. Multiple candidate comparisons can be used for history-based candidates to avoid duplicate entries in the final candidate list for the inter prediction. The candidate list for the inter prediction may include pairwise averaged candidates.

A candidate list for the IBC mode can include two BVs from respective spatial neighbors and five history-based BVs (HBVP). In an example, a candidate list for the IBC mode is limited to two BVs from respective spatial neighbors and five history-based BVs (HBVP). In an embodiment, in the IBC mode, only the first HBVP is compared with the spatial candidates when the first HBVP is added to the candidate list.

The regular inter prediction mode can use two different candidate lists, for example, one candidate list for the merge mode and the other candidate list for the regular mode (e.g., the inter prediction mode that is not the merge mode). The candidate list in the IBC mode can be identical for both IBC modes (e.g., a merge IBC mode and a regular IBC mode). In the IBC mode, the merge mode may use up to six candidates of the candidate list, and the regular mode uses only the first two candidates of the candidate list.

Block vector difference (BVD) coding can employ the MVD process used in the regular inter prediction mode, and a final BV can have any magnitude. The determined BV (e.g., the reconstructed BV) may point to an area outside of the reference sample area. In an example, a correction to the absolute offset for each direction can be applied using a modulo operation based on a width and/or a height of the RSM.

II.2 The IBC Mode in AV1

In some examples, such as in AV1, the IBC mode (or the IntraBC mode) uses a BV to locate a prediction block in a same picture of a current block. The BV can be signaled in a bitstream and a precision of the signaled BV can be integer-point. The prediction process in the IBC mode can be similar to a prediction process in the inter prediction mode (e.g., the inter-picture prediction). A difference between the IBC mode and the inter-picture prediction is described as below. In the IBC mode, a predictor block can be formed from reconstructed samples (e.g., before applying the loop filtering) of the current picture. The IBC mode can be considered as "motion compensation" within the current picture using the BV as an MV.

A flag that indicates whether the IBC mode is enabled or not for the current block can be transmitted in the bitstream. If the IBC mode is enabled for the current block, a BV difference can be derived by subtracting the predicted BV from the current BV, and the BV difference can be classified into four types according to a horizontal component and a vertical component of a value of the BV difference. The type information can be signaled into the bitstream, and the BV difference value of the two components (e.g., the horizontal component and the vertical component) can be signaled following the type information.

The IBC mode can be effective to code a screen content. The IBC mode may introduce challenges to hardware design. To facilitate the hardware design, the following modifications can be adopted in the IBC mode.

(i) When the IBC mode is allowed, loop filters can be disabled. The loop filters can include a deblocking filter, a constrained directional enhancement filter (CDEF), and a loop restoration (LR) filter. By disabling the loop filters, a second picture buffer dedicated to enable the IBC mode can be avoided.

(ii) To facilitate parallel decoding, the prediction cannot exceed the restricted areas. Coordinates of a top-left position of a superblock are (x0, y0). For the superblock, the prediction at a position (x, y) can be accessed by the IBC mode if the vertical coordinate is less than y0 and the horizontal coordinate is less than (x0+2(y0−y)). In an example, the prediction at the position (x, y) can be accessed by the IBC mode only if the vertical coordinate is less than y0 and the horizontal coordinate is less (x0+2(y0−y)). In an example, the prediction at the position (x, y) can be accessed by the IBC mode only if the vertical coordinate is less than or equal to y0 and the horizontal coordinate is less (x0+2(y0−y)).

Figure 12:
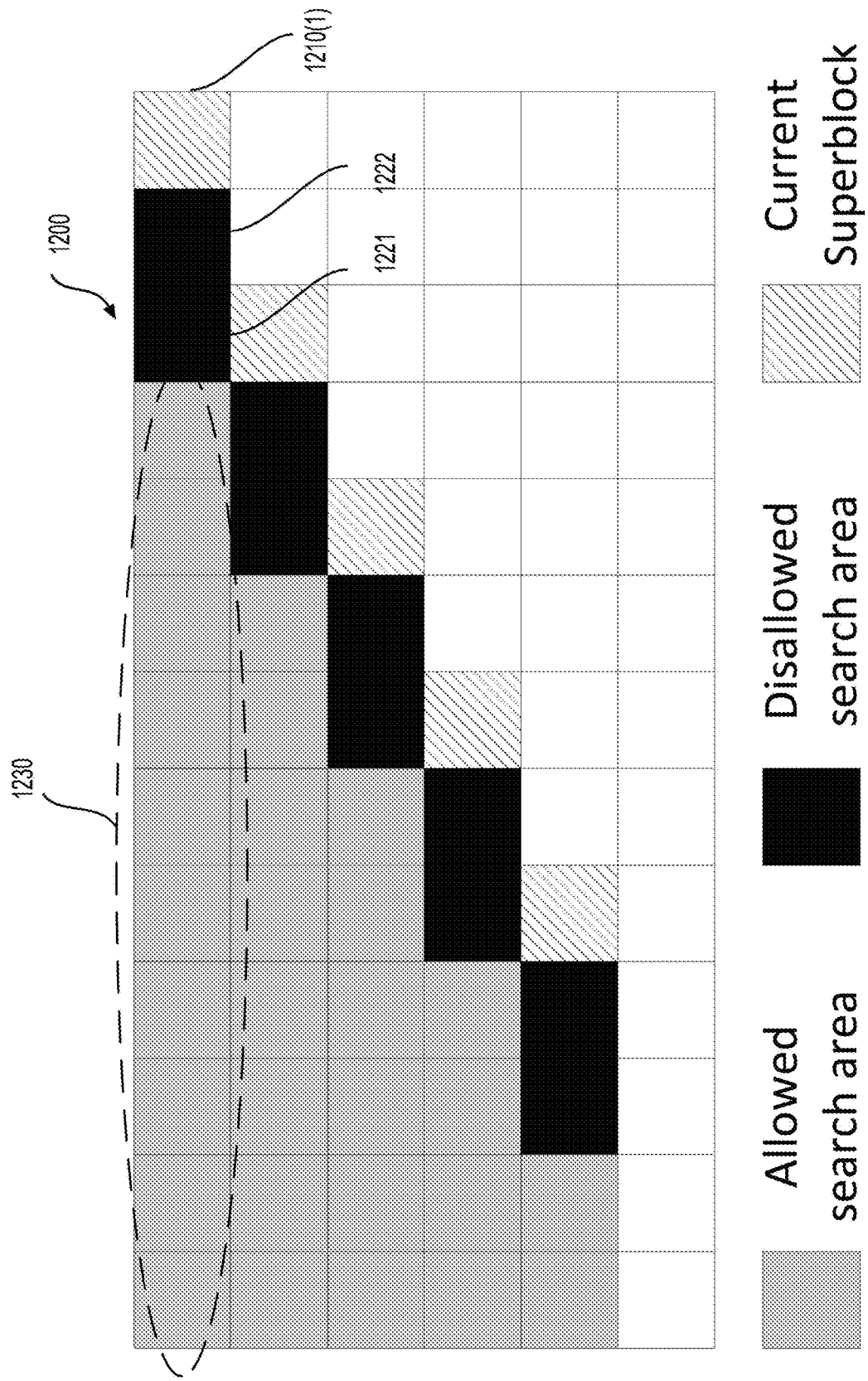
FIG. 12 shows an example of immediate reconstructed areas that are restricted.

(iii) To allow a hardware writing back delay, immediate reconstructed areas cannot be accessed by the IBC mode. The restricted immediate reconstructed area can include 1 to N super blocks where N is a positive integer. In addition to the modification (ii) as described above, if the coordinate of a top-left position of a superblock (1210) under reconstruction is (x0, y0), the prediction at the position (x, y) can be accessed by the IBC mode if the vertical coordinate is less than or equal to y0 and the horizontal coordinate is less than (x0+2 (y0−y)−D). D can indicate a size of the immediate reconstructed area(s) that are restricted for the IBC mode. FIG. 12 shows an example of the immediate reconstructed areas that are restricted. Gray-shaded areas include allowed search areas accessible in the IBC mode for respective current superblocks (1210) under reconstruction. Black-shaded areas include disallowed search areas that are not accessible in the IBC mode for the respective current superblocks (1210). White, non-shaded areas include superblocks to be coded (e.g., reconstructed). For the current superblock (1210(1)), the immediate reconstructed areas include two superblocks (1221)-(1222) that are to the left of the current superblock (1210(1)) (e.g., N is 2). D indicates a size of 2W where W is a width of each superblock. The superblocks (1221)-(1222) are not accessible for the current superblock (1210(1)). An area (1230) is accessible for the current superblock (1210(1)).

II.3 The IBC Mode With a Local Reference Range in AV1

An on-chip memory (referred as RSM) having a size M×M (e.g., 128×128) can be allocated to store reference samples used in the IBC mode. In an embodiment, the size of the RSM is equal to a size of a superblock, and the size of the superblock is allocated for the RSM. A memory reuse mechanism can be applied to the RSM on a L×L (e.g., 64×64) basis. The RSM can be divided into I RSM units where I is equal to a ratio of M×M over L×L. For example, if M×M is 128×128 and L×L is 64×64, I is 4 (128×128/(64×64)). A local reference range can be used in the IBC mode that is described in II.2. The following changes can be made to the IBC mode that is described in II.2.

(i) The largest block size in the IBC mode can be limited to L×L (e.g., 64×64).

(ii) A reference block and a corresponding current block in a current superblock (SB) can be in a same SB row. In an example, the reference block is only located in the current SB or a left neighboring SB to the left of the current SB.

(iii) When a unit having the size L×L (e.g., 64×64) of the RSM units begins to update with reconstructed samples of the current SB, previously stored reference samples (e.g., the reference samples of the left neighboring SB) in the entire L×L unit can be marked as unavailable to generate prediction samples used in the IBC mode.

Figure 13:
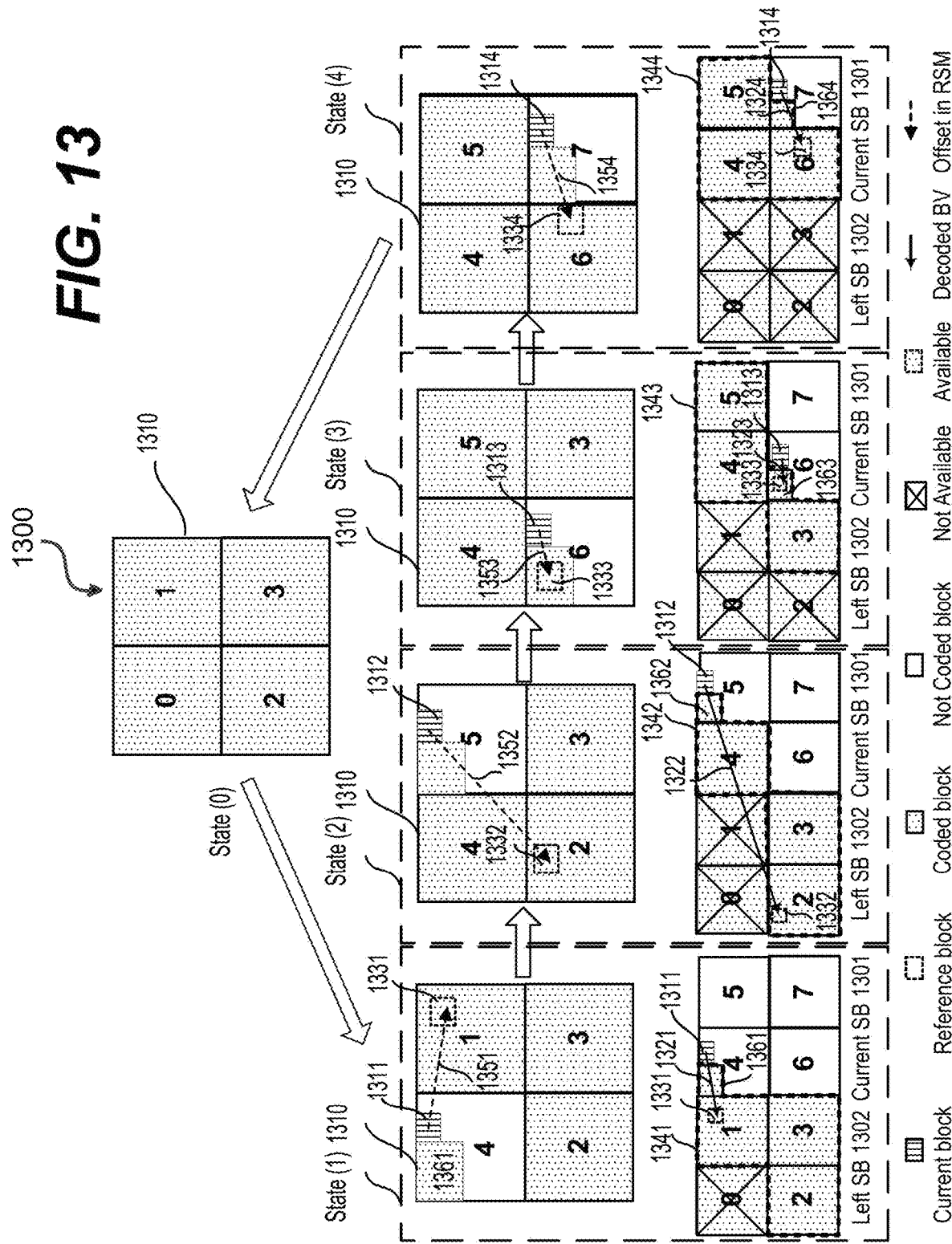
FIG. 13 shows an exemplary memory reuse mechanism.

FIG. 13 shows an exemplary memory reuse mechanism (1300) where a memory (e.g., an RSM (1310)) is updated during coding (e.g., encoding or decoding) of a current SB (1301) in a current picture according to an embodiment of the disclosure. The top block shows the RSM (1310) at a state (0). The top row shows the RSM (1310) at states (1)-(4). A bottom row shows the current SB (1301) that is being coded and a left neighboring SB (1302) in the current picture at the states (0)-(4). The left neighboring SB (1302) can be to the left of the current SB (1301). In an example of FIG. 13, a quad-tree split is used at a SB root and the SB can include four regions. In an example, a size of each of the four regions is 64×64. In an example, the current SB (1301) includes four regions 4-7, and the left neighboring SB (1302) includes four regions 0-3.

At the state (0) that is a beginning of coding each SB, such as the current SB (1301), the RSM (1310) can store samples of a previously coded SB (e.g., the left neighboring SB (1302)). When a current block is located in one of the four regions (e.g., the four 64×64 regions) in the current SB (1301), a corresponding region in the RSM (1310) can be emptied and used to store samples of the current coding region (e.g., the current 64×64 coding region). Samples in the RSM (1310) can be gradually updated by the samples in the current SB (1301).

Referring to the state (1), the current block (1311) is located in the region 4 in the current SB (1301), a corresponding region (e.g., a top-left region) in the RSM (1310) can be emptied and used to store samples of the region 4 that is the current region being coded. Referring to the bottom row, a BV (e.g., an encoded BV or a decoded BV) (1321) can point from the current block (1311) to a reference block (1331) that is within a search range (1341) (boundaries of the search range (1341) are marked by dashed lines) for the current block (1311). Referring to the top row, a corresponding offset (1351) in the RSM (1310) can point from the current block (1311) to the reference block (1331) in the RSM (1310). Referring to the state (1), the search range (1341) includes the regions 1-3 in the left neighboring SB (1302) and coded subregion (1361) in the region 4. The search range (1341) does not include the region 0 in the left neighboring SB (1302).

Referring to the state (2), the current block (1312) is located in the region 5 in the current SB (1301), a corresponding region (e.g., a top-right region) in the RSM (1310) can be emptied and used to store samples of the region 5 that is the current region being coded. A BV (e.g., an encoded BV or a decoded BV) (1322) can point from the current block (1312) to a reference block (1332) that is within a search range (1342) (boundaries of the search range (1342) are marked by dashed lines) for the current block (1312). A corresponding offset (1352) in the RSM (1310) can point from the current block (1312) to the reference block (1332) in the RSM (1310). Referring to the state (2), the search range (1342) includes (i) the regions 2-3 in the left neighboring SB (1302) and (ii) the region 4 and a coded subregion (1362) in the region 5 that are in the current SB (1301). The search range (1342) does not include the regions 0-1 in the left neighboring SB (1302).

Referring to the state (3), the current block (1313) is located in the region 6 in the current SB (1301), a corresponding region (e.g., a bottom-left region) in the RSM (1310) can be emptied and used to store samples of the region 6 that is the current region being coded. A BV (e.g., an encoded BV or a decoded BV) (1323) can point from the current block (1313) to a reference block (1333) that is within a search range (1343) (boundaries of the search range (1343) are marked by dashed lines) for the current block (1313). A corresponding offset (1353) in the RSM (1310) can point from the current block (1313) to the reference block (1333) in the RSM (1310). Referring to the state (3), the search range (1343) includes (i) the region 3 in the left neighboring SB (1302) and (ii) the regions 4-5 and a coded subregion (1363) in the region 6 that are in the current SB (1301). The search range (1343) does not include the regions 0-2 in the left neighboring SB (1302).

Referring to the state (4), the current block (1314) is located in the region 7 in the current SB (1301), a corresponding region (e.g., a bottom-right region) in the RSM (1310) can be emptied and used to store samples of the region 7 that is the current region being coded. A BV (e.g., an encoded BV or a decoded BV) (1324) can point from the current block (1314) to a reference block (1334) that is within a search range (1344) (boundaries of the search range (1344) are marked by dashed lines) for the current block (1314). A corresponding offset (1354) in the RSM (1310) can point from the current block (1314) to the reference block (1334) in the RSM (1310). Referring to the state (4), the search range (1344) includes the regions 4-6 and a coded subregion (1364) in the region 7 that are in the current SB (1301). The search range (1344) does not include the regions 0-3 in the left neighboring SB (1302).

When the current SB (1301) has been coded completely, the entire RSM (1310) can be filled with all the samples of the current SB (1301).

In the example shown in FIG. 13, the current SB (1301) is partitioned using the quad-tree split. A coding order of the four regions in the current SB (1301) can be the top-left region (e.g., the region 4), the top-right region (e.g., the region 5), the bottom-left region (e.g., the region 6), and the bottom-right region (e.g., the region 7). In other block split decisions such as shown in FIGS. 14A-14B, the RSM update process can be similar to that shown in FIG. 13, for example, by replacing the respective regions in the RSM using the reconstructed samples in the current SB.

Figure 14:
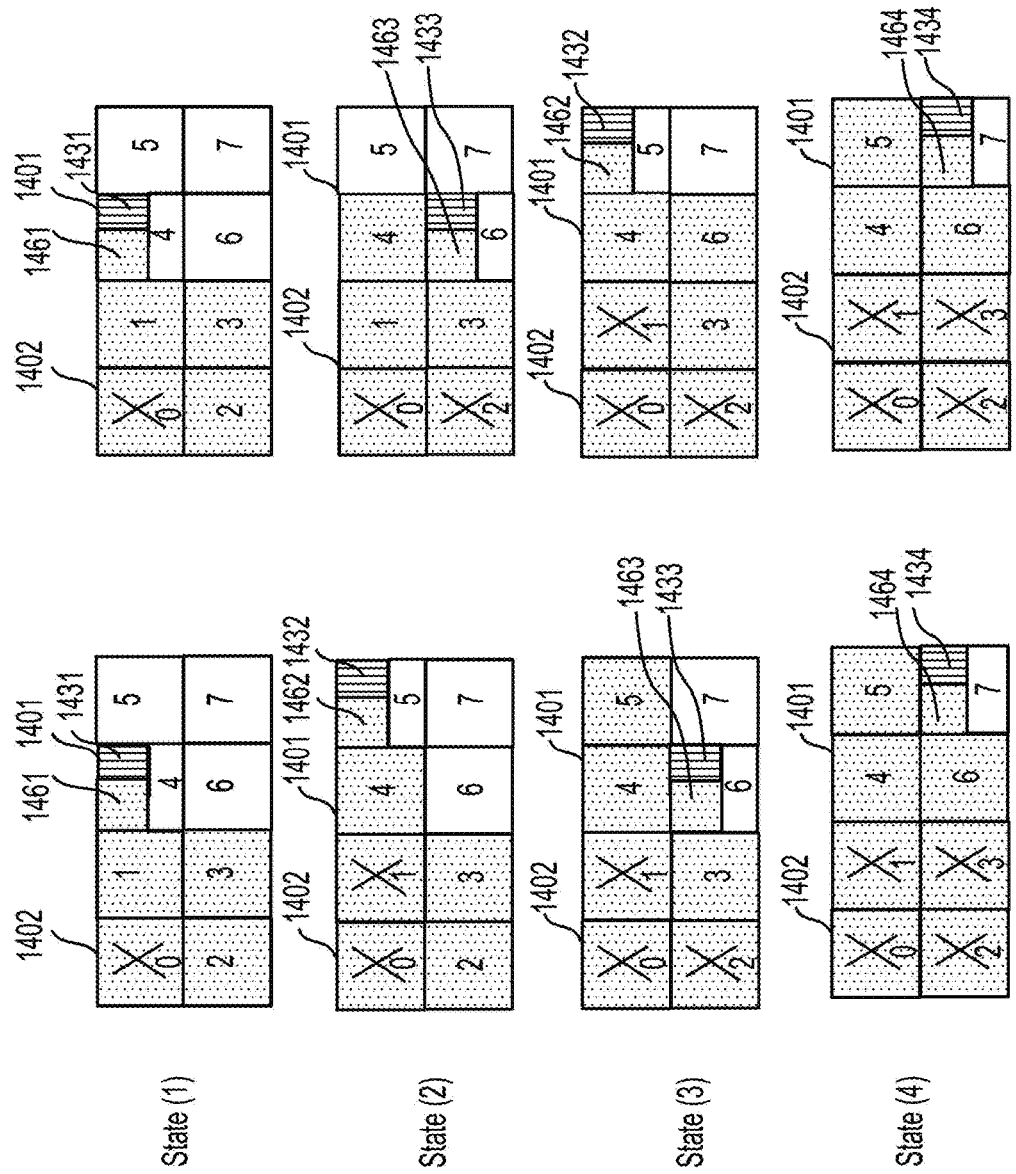
FIGS. 14A-14B show exemplary memory update processes in an RSM during coding of a current SB.

FIGS. 14A-14B show exemplary memory update processes in an RSM during coding (e.g., encoding or decoding) of a current SB (1401). In FIGS. 14A-14B, a left neighboring SB (1402) is to the left of the current SB (1401) that is being coded (e.g., encoded or decoded). In an example, a size of each of the current SB (1401) and the left neighboring SB (1402) is 128×128. Each of the current SB (1401) and the left neighboring SB (1402) can include four regions (e.g., four blocks) with a size of 64×64. The current SB (1401) can include the blocks 4-7, and the left neighboring SB (1402) can include the blocks 0-3.

In FIG. 14A, a horizontal split at a SB root is performed and is followed by a vertical split. An SB (e.g., the current SB (1401)) can include four blocks: a top-left block (e.g., the block 4), a bottom-left block (e.g., the block 6), a top-right block (e.g., the block 5), and a bottom-right block (e.g., the block 7). A coding order for the current SB (1401) can be the top-left block (state 1), the top-right block (state 2), the bottom-left block (state 3), and the bottom-right block (state 4).

In FIG. 14B, a vertical split at a SB root is performed and is followed by a horizontal split. A coding order for the current SB (1401) can be the top-left block (state 1), the bottom-left block (state 2), the top-right block (state 3), and the bottom-right block (state 4).

Depending on a location of a current block (e.g., (1431)) relative to the current SB (1401), the following can apply.
 (i) Referring to the state (1) in FIGS. 14A-14B, the current block (1431) is in the top-left block (e.g., the block 4) of the current SB (1401), an RSM can include reference samples in the bottom-right block (e.g., the block 3), the bottom-left block (e.g., the block 2), and the top-right block (e.g., the block 1) of the left neighboring SB (1402) in addition to already reconstructed samples in a block (1461) that is in the block 4.
 (ii) Referring to the state (2) in FIG. 14A or the state (3) in FIG. 14B, the current block (1432) is in the top-right block (e.g., the block 5) of the current SB (1401).

If a luma sample located at a top-left corner (e.g., (0, 64) relative to the current SB (1401)) of the block 6 has not yet been reconstructed, such as shown at the state (2) in FIG. 14A, in addition to the already reconstructed samples in the block 4 and a block (1462) that is in the block 5, the current block (1432) can refer to the reference samples in the bottom-left block (e.g., the block 2) and the bottom-right block (e.g., the block 3) of the left neighboring SB (1402). The corresponding RSM can include the reference samples in the bottom-left block (e.g., the block 2) and the bottom-right block (e.g., the block 3) of the left neighboring SB (1402) in addition to the block 4 and the block (1462) that is in the block 5.

Otherwise, if the luma sample located at the top-left corner (e.g., (0, 64) relative to the current SB (1401)) of the block 6 has been reconstructed, such as shown at the state (3) in FIG. 14B, the current block (1432) can refer to reference samples in the bottom-right block (e.g., the block 3) of the left neighboring SB (1402). The corresponding RSM can include the reference samples in the bottom-right block (e.g., the block 3) of the left neighboring SB (1402) in addition to the already reconstructed samples in the blocks 4 and 6 and the block (1462) that is in the block 5.

(iii) Referring to the state (3) in FIG. 14A or the state (2) in FIG. 14B, the current block (1433) is in the bottom-left block (e.g., the block 6) of the current SB (1401).

If a luma sample located at a top-left corner of the block 5 (e.g., (64, 0) relative to the current SB (1401)) has not yet been reconstructed, such as shown at the state (2) in FIG. 14B, in addition to the already reconstructed samples in the block 4 and a block (1463) that is in the current SB (1401), the current block (1433) can refer to the reference samples in the top-right block (e.g., the block 1) and the bottom-right block (e.g., the block 3) of the left neighboring SB (1402). The corresponding RSM can include the reference samples in the top-right block (e.g., the block 1) and the bottom-right block (e.g., the block 3) of the left neighboring SB (1402) in addition to the block 4 and the block (1463) that is in the current SB (1401).

Otherwise, if the luma sample located at the top-left corner of the block 5 (e.g., (64, 0) relative to the current SB (1401)) has been reconstructed, such as shown at the state (3) in FIG. 14A, the current block (1433) can refer to reference samples in the bottom-right block (e.g., the block 3) of the left neighboring SB (1402). The corresponding RSM can include the reference samples in the bottom-right block (e.g., the block 3) of the left neighboring SB (1402) in addition to the already reconstructed samples in the blocks 4-5 and the block (1463) that is in the current SB (1401).

(iv) Referring to the state (4) in FIGS. 14A-14B, the current block (1434) is in the bottom-right block (e.g., the block 7) of the current SB (1401). The current block (1434) can refer to the already reconstructed samples in the current SB (1401), such as the already reconstructed samples in the blocks 4-6 and a block (1464). The corresponding RSM can include the reference samples in the blocks 4-6 and the block (1464). In an example, if the current block (1434) falls into the bottom-right block of the current SB (1401), the current block can only refer to the already reconstructed samples in the current SB (1401).

III. An IBC Mode With an Adaptive Local Reference Range

The performance of the IBC mode can highly depend on a reference range that is used in the IBC mode. In related technologies, such as the IBC mode in VVC and the IBC mode with a local reference range, a pre-defined memory update mechanism can be used in an RSM. In an example, the memory update in the RSM only depends on a block position of a current block and partitioning of a current CTU or a current SB, such as described in FIGS. 13, 14A, and 14B. The memory update does not depend on a content or prediction information, for example, of a current block during the memory update process. In some embodiments, for an area in a picture with little or no texture content, and thus including the area in a reference range (e.g., a local reference range) and storing the area in the picture in the RSM may have limited benefit for prediction efficiency of the IBC mode. According to an embodiment of the disclosure, an adaptive reference range, such as an adaptive local reference range can be used in an IBC mode.

In the following description, the term block may be interpreted as a transform block (TB), PB, a coding block (CB), a coding unit (CU), a superblock in a picture, a CTU or a CTB, or the like. A block size can refer to a block width, a block height, a maximum value of the block width and the block height, a minimum of value of the block width and the block height, an area size (e.g., the block width×the block height), an aspect ratio (e.g., a block width/a block height, or a block height/a block width) of a block, or the like.

In some examples, a size of 64×64 is used as an example of a memory update area unit. The memory update area unit can be any block size and is not limited to the size 64×64. Examples of memory update area units include the regions 0-7 in FIG. 13 and the regions 0-7 in FIGS. 14A-14B.

According to an embodiment of the disclosure, whether to update a local reference range used in an IBC mode is determined based on a reconstructed area that is in a superblock under reconstruction in a current picture. The superblock can include one or more CBs. The local reference range can be restricted. In an example, a maximum size of the local reference range is restricted, for example, to be a size of multiple superblocks, such as the size of two superblocks shown in FIGS. 13, 14A, and 14B. In an example, a spatial range of the local reference range is restricted, for example, to be within multiple superblocks (e.g., the superblock and a left neighboring superblock of the superblock, such as shown in FIGS. 13, 14A, and 14B). In some embodiments, whether to update the previous local reference range is determined based on (i) a content of the reconstructed area and/or (ii) prediction information of the reconstructed area.

A size of the reconstructed area can be equal to a size of a memory update area unit (e.g., 64×64), for example, when the size of the memory update area unit is less than a size of a reconstructed CB. The reconstructed area can be a reconstructed CB, for example, when the size of the reconstructed CB is less than or equal to the size of the memory update area unit.

The content of the reconstructed area can include a texture content and/or a screen content of the reconstructed area. The content of the reconstructed area can be determined based on reconstructed samples (or reconstructed pixels) of the reconstructed area.

The prediction information of the reconstructed area can indicate prediction mode(s) used to reconstruct the area. In an embodiment, whether to update the previous local reference range is determined based on whether the prediction mode(s) are in a set of pre-defined prediction modes. If the prediction mode(s) are in the set of pre-defined prediction modes, the previous local reference range can be updated. If the prediction mode(s) are not in the set of pre-defined prediction modes, the previous local reference range is not updated. In an embodiment, the set of pre-defined prediction modes includes screen content coding mode(s), such as the IBC mode, a palette mode, a transform skip mode, a block based delta pulse code modulation (BDPCM) mode, and/or the like.

In an embodiment, the prediction information indicates, for example, via a flag included in the prediction information of the area, whether to update the previous local reference range with the reconstructed samples in the reconstructed area. Accordingly, whether to update the previous local reference range can be based on the indication (e.g., the flag), in the prediction information, of whether to update the previous local reference range with the reconstructed samples in the reconstructed area.

In an embodiment, a memory update process in the RSM of the IBC mode depends on a content (e.g., values of the reconstructed samples) of a current block or an area (e.g., a 64×64 region) and/or prediction information (or coded information) of the current block or the area.

Figure 15:
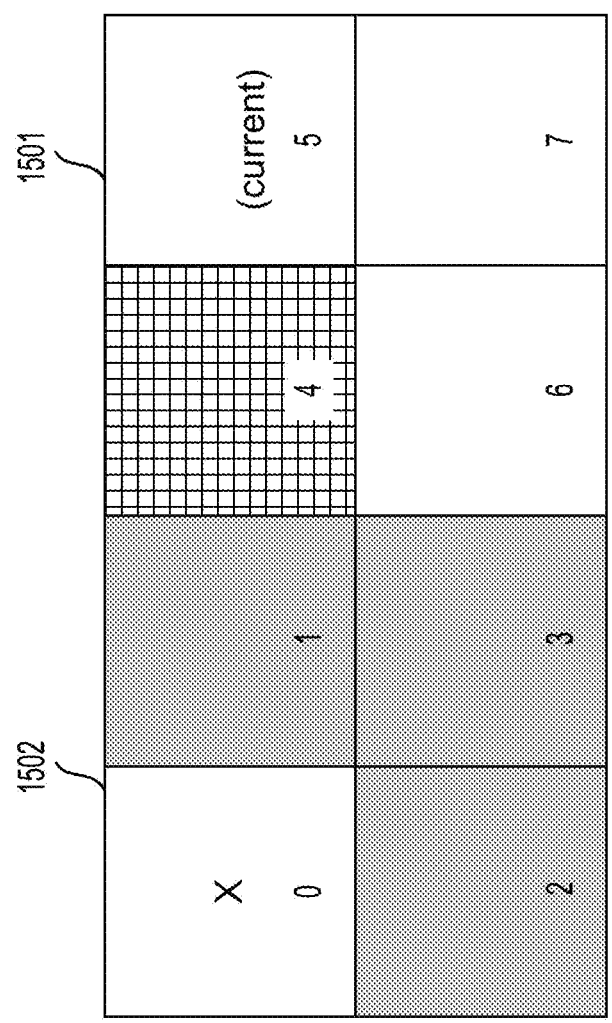
FIG. 15 shows an exemplary adaptive memory update process in an RSM when a current SB is being decoded.

In an example, after a current block (e.g., a current CB) or an area (e.g., a 64×64 region) has been reconstructed, an evaluation of a content (e.g., values of reconstructed samples) of the current block or the area is performed. Whether to perform a memory update can be determined based on the evaluation. FIG. 15 shows an exemplary adaptive memory update process in an RSM when a current SB (1501) is being decoded. Each of the current SB (1501) and a left neighboring SB (1502) of the current SB (1501) includes four regions. The current SB (1501) includes regions 4-7, and the left neighboring SB (1502) includes regions 0-3. In an example, each of the regions 0-7 has a size of 64×64. The left SB (1502) including the regions 0-3 has been reconstructed. A previous local reference range used in the IBC mode is stored in the RSM. In an example, the previous local reference range includes the regions 1-3. In the example shown in FIG. 15, the local reference range of the region 5 does not include the region 0.

The region 4 in the current SB (1501) has been reconstructed, for example, after the reconstruction of the left SB (1502). A content (e.g., reconstructed samples) of the region 4 can be evaluated to determine whether to perform a memory update to update the RSM storing the previous local reference range. If the determination is not to update the RSM, the RSM is not updated and the previous local reference range is not updated. The previous local reference range can be used to reconstruct the region 5 (e.g., the current region that is under reconstruction). In an example, the previous local reference range includes the regions 1-3 and does not include the region 4 that is already reconstructed prior to the reconstruction of the region 5. Thus, the search area of the region 5 includes the regions 1-3 and does not include the region 4. In an example, the search area of the region 5 includes an already reconstructed part of the region 5 that is being reconstructed.

In an embodiment, the evaluation process determines whether a texture content of the reconstructed block or the reconstructed area (e.g., a 64×64 region) satisfies a condition. Referring to FIG. 15, a texture content of the reconstructed region 4 can be evaluated. For example, a percentage of the texture content of the reconstructed block or the reconstructed area is determined. If the percentage of the texture content of the reconstructed block or the reconstructed area is larger than or equal to a threshold, the condition is determined to be satisfied. Otherwise, the condition is determined not to be satisfied.

A content of the reconstructed block or the reconstructed area can be determined by any suitable method(s), such as based on a histogram of intensity values in one or multiple color components. In an example, if the histogram includes more than N0 but less than N1 distinct intensity values in the one or multiple color components, the reconstructed block or the reconstructed area is determined as a screen content area. Otherwise, the reconstructed block or the reconstructed area is determined as a texture area. A texture area can be captured by camera(s), and can also be referred to as a natural area or a camera captured area. In an example, a screen content area is not captured by camera(s). Referring to FIG. 15, a histogram of intensity values in one or multiple color components associated with the region 4 can be used to determine whether the region 4 is a texture area or a screen content area.

In an embodiment, the evaluation process determines whether the reconstructed block or the reconstructed area (e.g., a 64×64 region) is coded by prediction mode(s) of a set of pre-defined prediction modes. In an example, the set of pre-defined prediction modes includes screen content coding mode(s), such as an IBC mode, a palette mode, a transform skip mode, a BDPCM mode, and/or the like.

In an embodiment, if the evaluation process determines that a screen content of the reconstructed block or the reconstructed area (e.g., a 64×64 region) satisfies a condition, for example, the amount or percentage of screen content is less than a threshold, the memory update process is skipped for the reconstructed block or the reconstructed area, and thus is not performed after coding (e.g., encoding or decoding) the block or the area. If the memory update process is skipped, the previous local reference range stored in the RSM is used to decode another coding block or another area that is to be reconstructed. In an example, the reconstructed block or the reconstructed area does not contain any screen content, the memory update process is skipped for the reconstructed block or the reconstructed area, and thus is not performed after coding the block or the area.

In the example shown in FIG. 15, a size of each region of the regions 0-7 is equal to a size of the memory update area unit. A size of the RSM is equal to a size of the superblock. Embodiments described with reference to FIG. 15 can be suitably adapted to other situations where a superblock may include any suitable number of regions with any suitable size. A size of the RSM may be equal to, larger than, or smaller than the size of the superblock.

In the example shown in FIG. 15, the evaluation process is based on a region (e.g., the region 4) that has an identical size as that of the memory update area unit. Thus, after reconstructing the region, if the evaluation process indicates that the previous local reference range is to be updated, reconstructed samples in the entire region are used to update the previous local reference range.

In some examples, the evaluation process is based on a portion of a region that has an identical size as that of the memory update area unit. For example, a size of a CB is less than the size of the memory update area unit, and the portion of the region is the CB. After reconstructing the portion of the region (e.g., the CB), if the evaluation process indicates that the previous local reference range is to be updated, reconstructed samples in the portion of the region (e.g., the CB) are used to update the previous local reference range. In an example, for the region that has the size of the memory update area unit, a first portion of the region can be used to update the previous reference range and a second portion of the region is not used to update the previous reference range.

Accordingly, the local reference range can include first reconstructed samples of the first portion of the region and does not include second reconstructed samples of the second portion of the region. If position(s) of the second reconstructed samples of the second portion of the region are referred to by a BV, a padding process can be used to generate sample(s) to be used in the IBC mode, such as shown in FIG. 16.

Figure 16:
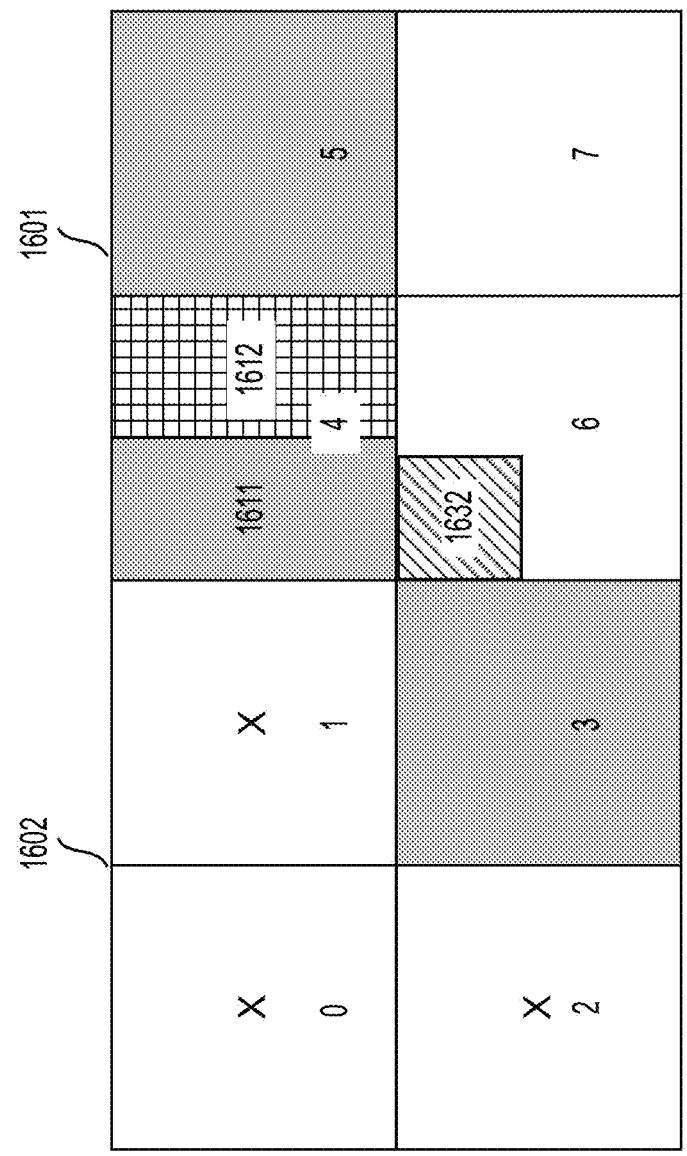
FIG. 16 shows an exemplary padding process used in an adaptive memory update process.

FIG. 16 shows an exemplary padding process used in an adaptive memory update process. Each of a current SB (1601) and a left neighboring SB (1602) of the current SB (1601) includes four regions. The current SB (1601) includes regions 4-7, and the left neighboring SB (1602) includes regions 0-3. In an example, each of the regions 0-7 has a size of 64×64. The left SB (1602) including the regions 0-3 and the regions 4-5 of the current SB (1601) are already reconstructed.

The region 4 includes a first portion (1611) and a second portion (1612). In an example, the first portion (1611) is a first CB and the second portion (1612) is a second CB. In an example, a memory update is performed where a local reference range used in the IBC mode is updated to include the first CB (1611). The memory update is not performed after reconstructing the second CB (1612) where the local reference range used in the IBC mode is not updated to include the second CB (1612). In an example, after the reconstruction of the region 5, the local reference range includes the region 3, the first portion (1611) in the region 4, and the region 5. In the example shown in FIG. 16, the local reference range does not include the regions 0-2 in the left neighboring SB (1602). The local reference range does not include the second portion (1612) in the region 4. The second portion (1612) in the region 4 is not stored in the RSM.

In an embodiment, when performing the IBC prediction using the local reference range that is stored in the RSM, a padding process can be applied to fill a region (e.g., the region 4 in FIG. 16) in the RSM if not all of the reconstructed samples in the region (e.g., the region 4 in FIG. 16) are stored in the RSM. Referring to FIG. 16, a CB (1632) in the region 6 is to be reconstructed with the IBC mode. Samples in the second portion (1612) in the region 4 can be generated by the pad process before being used as reference samples in the IBC mode for the CB (1632).

In an example, a single value is assigned to the second portion (1612) in the region 4 of the local reference range that is stored in the RSM. For examples, each sample in the second portion (1612) has an identical value that is equal to the single value. In an example, the single value is based on sample(s) that are available and are neighbors to the second portion (1612). The sample(s) that are available and that are neighbors to the second portion (1612) can be located within the region 4 or outside the region 4. In an example, the single value is equal to a value of one of the sample(s) that are neighbors to the second portion (1612).

In an example, the padding process is implemented by performing a specific intra prediction, for example, a DC prediction, a planar prediction, or the like to the second portion (1612) in the region 4 in the RSM using the sample(s) that are available and are neighbors of the second portion (1612) in the region 4.

In an example, the padding process is implemented by copying the samples that are available and are neighbors of the second portion (1612) in the region 4.

In some examples, a padding process is performed for a boundary area outside the region 4.

In an embodiment, when performing a memory update process in an RSM, stored blocks (or stored regions) in the RSM can be ranked. Which one of the stored blocks in the RSM is replaced during the memory update process can be determined based on the ranking. In an example, each of the stored blocks has the size of the memory update area unit (e.g., 64×64).

Figure 17:
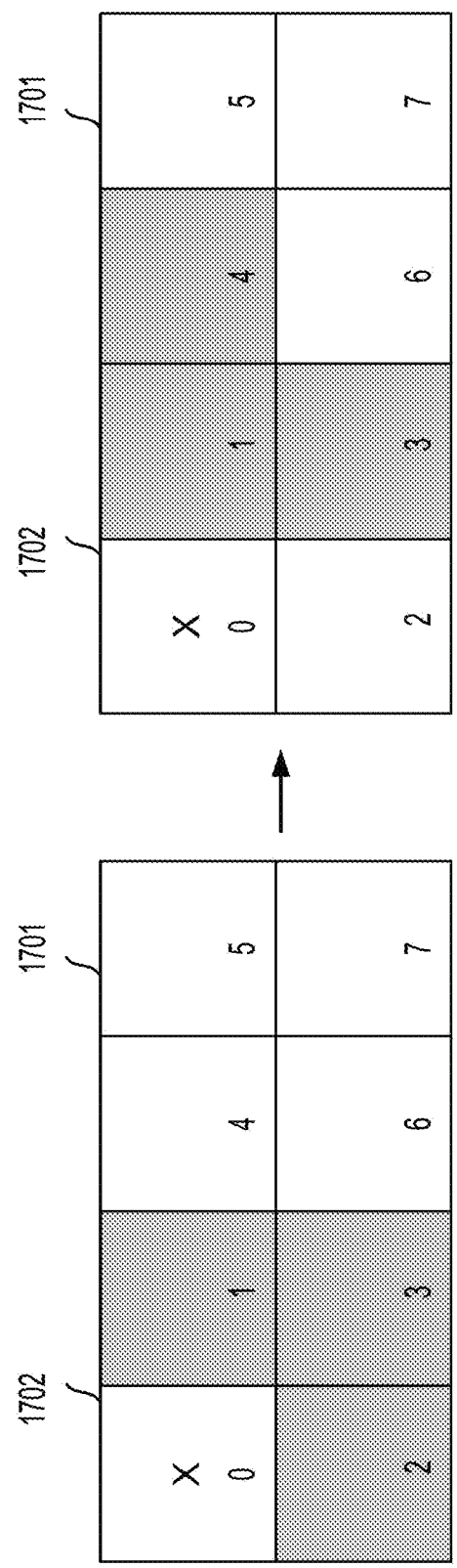
FIG. 17 shows an exemplary adaptive memory update process in an RSM.

Referring to FIG. 17, each of a current SB (1701) and a left neighboring SB (1702) of the current SB (1701) includes four regions. The current SB (1701) includes regions 4-7, and the left neighboring SB (1702) includes regions 0-3. In an example, each of the regions 0-7 has a size of 64×64. The left SB (1702) including the regions 0-3 has been reconstructed.

Referring to a left side of FIG. 17, the region 4 is under reconstruction, and the regions 5-7 are not reconstructed yet. A local reference range used in the IBC mode is stored in the RSM. In an example, the local reference range includes the regions 1-3 and does not include the region 0.

Referring to a right side of FIG. 17, after reconstructing the region 4, the local reference range is to be updated based on the reconstructed region 4. In an example, the regions 1-3 stored in the RSM are ranked. Which one of the regions 1-3 is replaced during the memory update process by the reconstructed region 4 can be determined based on the ranking. For example, if the ranking indicates that the region 2 is to be replaced, then the local reference range is updated by replacing the region 2 with the reconstructed region 4. The updated local reference range on the right side of the FIG. 17 includes the regions 1, 3, and 4.

In an example, a percentage of the reconstructed samples that correspond to screen content is determined for each of the stored blocks (e.g., the regions 1-3 in FIG. 17) in the RSM. Based on the ranking of the percentages of screen content of the respective stored blocks, which of the stored blocks stored in the RSM is replaced during the memory update process is determined.

In an example, a percentage of the reconstructed samples that correspond to texture areas is determined for each of the stored blocks (e.g., the regions 1-3 in FIG. 17) in the RSM. Based on the ranking of the percentages of texture areas of the respective stored blocks, which of the stored blocks stored in the RSM is replaced during the memory update process is determined.

In an example, a frequency (e.g., a reference frequency) associated with each of the stored blocks (e.g., the regions 1-3 in FIG. 17) in the RSM is determined. In an example, the reference frequency indicates a number of times the respective stored block is referenced by BVs in the IBC mode to predict CBs in a current picture or a portion of the current picture. Based on the ranking of the reference frequencies for the respective stored blocks, which of the stored blocks stored in the RSM is replaced during the memory update process is determined.

In an example, a number (e.g., an area size) of specially coded samples of each of the stored blocks (e.g., the regions 1-3 in FIG. 17) is determined where the specially coded samples are coded with one or more prediction modes in a set of pre-defined prediction modes. In an example, the set of pre-defined prediction modes includes screen content coding mode(s), such as an IBC mode, a palette mode, a transform skip mode, a BDPCM mode, and/or the like, as described above. Based on the ranking of the numbers of specially coded samples of the respective stored blocks, which of the stored blocks stored in the RSM is replaced during the memory update process is determined.

In addition to or instead of determining whether to update a local reference range based on a content or prediction mode(s) of a reconstructed area or a reconstructed block, whether to update the local reference range can be determined based on prediction information of the reconstructed area or the reconstructed block that indicates whether to update the local reference range. For example, the prediction information includes a flag (e.g., an indication flag) of the reconstructed area or the reconstructed block that indicates explicitly whether to update the local reference range, and whether to update the local reference range is determined based on the flag. In some examples, whether to update the local reference range is determined based on the flag, the content, and/or the prediction mode(s) of the reconstructed area or the reconstructed block.

In an embodiment, the adaptive memory update process is similar to embodiments described in FIGS. 15-17 except that whether the memory update process is performed in the RSM of the IBC mode depends on an indication (e.g., a flag) sent in a bitstream for each of the memory update area unit.

In an embodiment, for each coded area (e.g., a size of the coded area is identical to a size of the memory update area unit), a flag is signaled to indicate if reconstructed samples in the coded area are to be stored in the RSM. If the flag indicates that the reconstructed samples in the coded area are to be stored in the RSM, the memory update process is performed, such as described in the disclosure. Otherwise, if the flag indicates that the reconstructed samples in the coded area are not to be stored in the RSM, the reconstructed samples in the coded area do not need to be stored in the RSM. For example, the memory update process is skipped.

In an embodiment, when a current block size (e.g., a size of a CB) is larger than the size of the memory update area unit, the current block (e.g., the CB) can include multiple regions where each of the multiple regions has a size of the memory update area unit. A first flag of a first region in the current block can be signaled, and subsequent flag(s) of other regions in the current block can be inferred or signaled. In an example, the subsequent flag(s) can be inferred from the first flag of the first region in the current block. For example, the subsequent flag(s) use the same value of the first flag of the first region. In an example, the subsequent flag(s) are signaled where a respective flag is signaled separately for each of the multiple regions. Whether samples in the respective region are to be stored in the RSM can be determined based on the respective flag signaled in the bitstream. Accordingly, multiple flags are signaled for the current block.

In an embodiment, a flag for a region of a fixed size is signaled to indicate if samples in the region of the fixed size are to be stored in the RSM. The region of the fixed size can be larger than the memory update area unit. For example, the region of the fixed size is a superblock, a CTU, or a CTB, for example, having a size of 128×128 where the size of the memory update area unit is 64×64. The flag can be used to indicate if any sample(s) in the region (e.g., the superblock, the CTU, or the CTB) of the fixed size are to be stored in the RSM.

In some embodiments of the disclosure, superblock(s) are used as examples, such as in descriptions with reference to FIGS. 15-17. The descriptions are applicable to CTU(s) or CTB(s), and can be adapted by replacing superblock(s) with CTU(s) or CTB(s).

Figure 18:
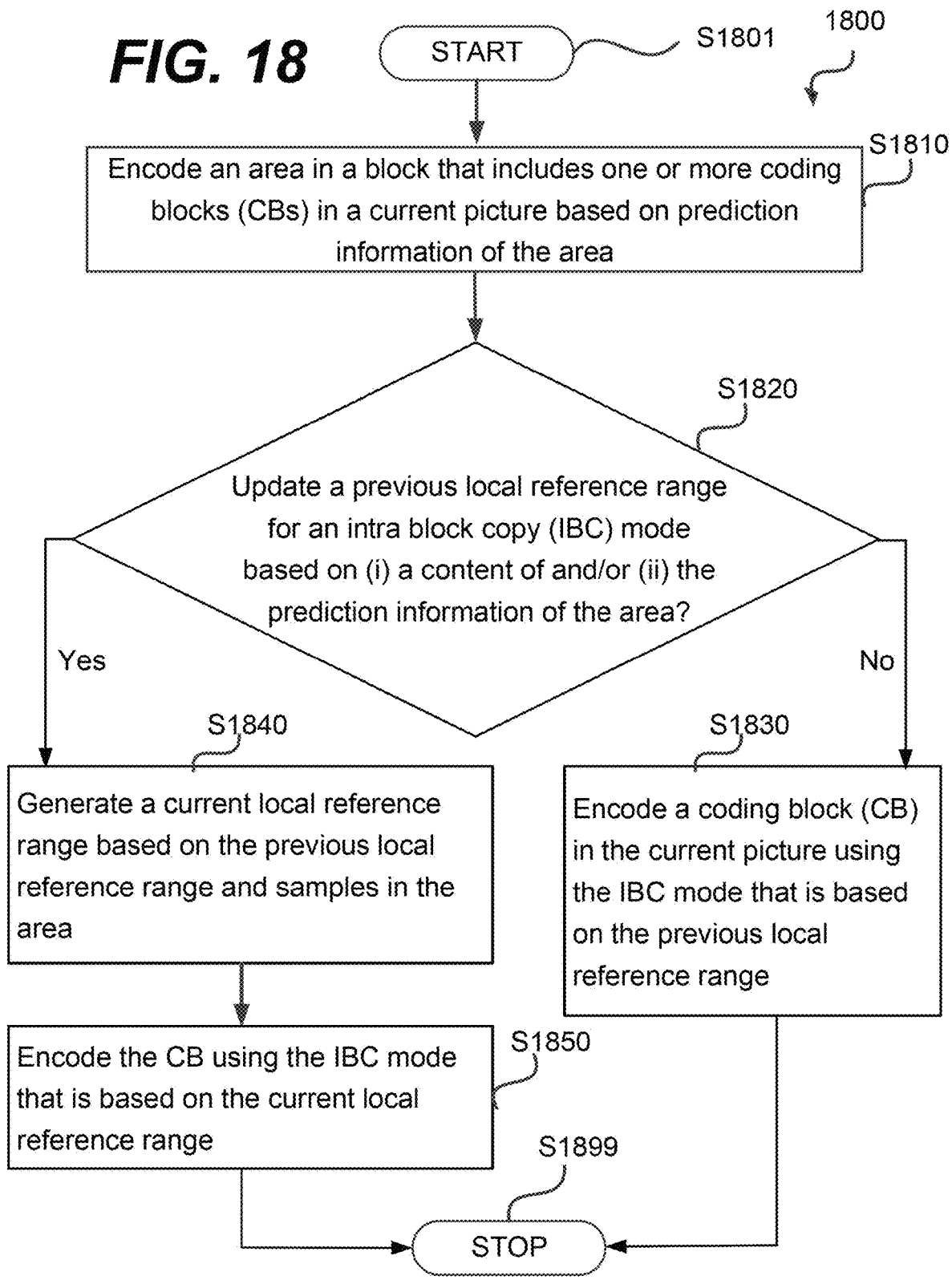
FIG. 18 shows a flow chart outlining an encoding process according to an embodiment of the disclosure.

FIG. 18 shows a flow chart outlining an encoding process (1800) according to an embodiment of the disclosure. In various embodiments, the process (1800) is executed by processing circuitry, such as the processing circuitry in the terminal devices (310), (320), (330) and (340), processing circuitry that performs functions of a video encoder (e.g., (403), (603), (703)), or the like. In some embodiments, the process (1800) is implemented in software instructions, thus when the processing circuitry executes the software instructions, the processing circuitry performs the process (1800). The process starts at (S1801), and proceeds to (S1810).

At (S1810), an area in a superblock or a coding tree block (CTB) in a current picture can be encoded based on prediction information of the area. The prediction information of the area can indicate one or more prediction modes of the area. The area can be encoded based on the one or more prediction modes of the area. In an example, the area is a CB in the superblock or the CTB. In an example, the area is a portion of a CB. In an example, a size of the superblock or the CTB is 128×128. In an example, a size of the area is a size of a memory update area unit, such as 64×64.

At (S1820), whether to update a previous local reference range for an intra block copy (IBC) mode based on (i) a content of and/or (ii) the prediction information of the area can be determined. In an example, the content of the area is indicated by samples in the corresponding reconstructed area where the samples are reconstructed samples in the spatial domain.

In an example, the content of the area indicates a percentage of a texture content and/or a percentage of a screen content in the area. Whether to update the previous local reference range for the IBC mode is determined based on the percentage of the texture content and/or the percentage of the screen content in the area. For example, the content of the area includes no screen content, and the previous local reference range for the IBC mode is determined not to be updated.

In an example, whether to update the previous local reference range for the IBC mode is determined based on whether the one or more prediction modes are in a set of pre-defined prediction modes.

In response to a determination not to update the previous local reference range for the IBC mode, the process (1800) proceeds to (S1830). Otherwise, in response to a determination to update the previous local reference range for the IBC mode, the process (1800) proceeds to a branch including (S1840) and (S1850).

At (S1830), a coding block (CB) in the current picture can be encoded using the IBC mode that is based on the previous local reference range which does not include the samples in the area. After (S1830), the process (1800) proceeds to (S1899), and terminates.

In the branch including (S1840) and (S1850), the previous local reference range for the IBC mode is determined to be updated.

At (S1840), a current local reference range can be generated based on the previous local reference range and the samples (e.g., the reconstructed samples) in the corresponding reconstructed area.

The previous local reference range can include multiple areas stored in a reference sample memory (RSM). The current local reference range can be generated by replacing reference samples in one of the multiple areas in the previous local reference range with the samples in the area.

In some embodiments, which one of the multiple areas in the previous local reference range is to be replaced is determined based on a ranking of the multiple areas. Accordingly, an area in the multiple areas to be replaced by the samples in the area can be selected based on the ranking of the multiple areas. The current local reference range can be generated by replacing the selected area in the previous local reference range with the samples in the area.

In some examples, the multiple areas are ranked based on contents of the multiple areas. Each of the contents can correspond to a respective one of the multiple areas. In an example, each of the contents corresponding to the respective one of the multiple areas is indicated by a percentage of a screen content or a percentage of a texture content in the corresponding area, and the multiple areas are ranked based on the respective percentages of the screen contents or the respective percentages of the texture contents of the multiple areas.

In some examples, each area of the multiple areas includes a number of specially coded reference samples in the respective area that are coded with one or more prediction modes in a set of pre-defined prediction modes. The multiple areas can be ranked based on the respective numbers of specially coded samples in the multiple areas.

In some examples, a reference frequency associated with each area of the multiple areas indicates a number of times that the respective area is referenced by block vectors used to predict CBs in the current picture or a portion in the current picture. The multiple areas can be ranked based on the respective reference frequencies of the multiple areas.

After (S1840), the process (1800) proceeds to (S1850). At (S1850), a CB can be encoded using the IBC mode that is based on the current local reference range. After (S1850), the process (1800) proceeds to (S1899), and terminates.

The process (1800) can be suitably adapted to various scenarios and steps in the process (1800) can be adjusted accordingly. One or more of the steps in the process (1800) can be adapted, omitted, repeated, and/or combined. Any suitable order can be used to implement the process (1800). Additional step(s) can be added.

In some examples, the prediction information includes a flag that indicates whether to update the previous local reference range with the samples in the area. The flag can be encoded and included in the video bitstream. In an example, a single flag is signaled for a CB. In an example, a plurality of flags is signaled for a CB. For example, the CB includes a plurality of regions where each of the plurality of regions has a size of the memory update area unit, and a separate flag is signaled for the respective region.

Figure 19:
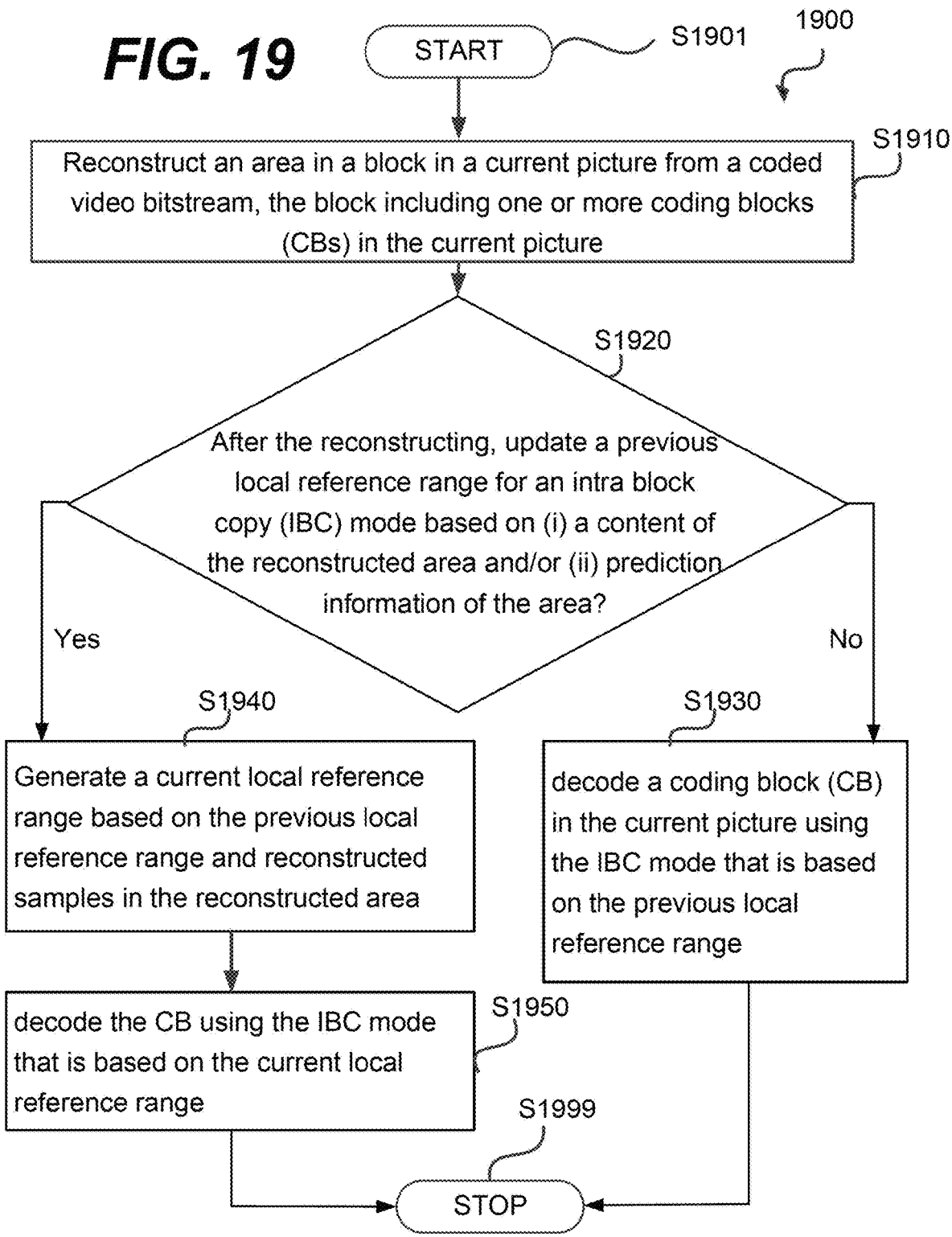
FIG. 19 shows a flow chart outlining a decoding process according to an embodiment of the disclosure.

FIG. 19 shows a flow chart outlining a decoding process (1900) according to an embodiment of the disclosure. In various embodiments, the process (1900) is executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1900) is implemented in software instructions, thus when the processing circuitry executes the software instructions, the processing circuitry performs the process (1900). The process starts at (S1901), and proceeds to (S1910).

At (S1910), an area in a block in a current picture can be reconstructed from a coded video bitstream. The block can include one or more coding blocks (CBs) in the current picture. The block can be a superblock or a CTB in the current picture. In an example, the block, such as the superblock or the CTB, is the largest CB in the current picture. In an example, the area is a CB in the superblock or the CTB. In an example, the area is a portion of a CB in the superblock or the CTB. In an example, a size of the block is 128×128. In an example, a size of the area is a size of a memory update area unit, such as 64×64.

At (S1920), after the reconstructing, whether to update a previous local reference range for an intra block copy (IBC) mode can be determined based on (i) a content of the reconstructed area and/or (ii) prediction information of the reconstructed area as described in the disclosure, such as described in FIG. 15.

In an embodiment, whether to update the previous local reference range for the IBC mode is determined based on the content of the reconstructed area. For example, the content of the reconstructed area is determined based on the reconstructed samples in the reconstructed area where the content of the reconstructed area indicates a percentage of a texture content and/or a percentage of a screen content in the reconstructed area. Accordingly, whether to update the previous local reference range for the IBC mode is determined based on the percentage of the texture content and/or the percentage of the screen content in the reconstructed area. In an example, the content of the reconstructed area includes no screen content, and the previous local reference range for the IBC mode is determined not to be updated.

In an embodiment, whether to update the previous local reference range for the IBC mode is determined based on the prediction information of the reconstructed area. The prediction information is decoded.

In an example, the prediction information of the area indicates one or more prediction modes of the area. Whether to update the previous local reference range for the IBC mode is determined based on whether the one or more prediction modes are in a set of pre-defined prediction modes. In an example, the set of pre-defined prediction modes includes screen content coding mode(s), such as an IBC mode, a palette mode, a transform skip mode, a BDPCM mode, and/or the like.

In an example, the prediction information of the area indicates whether to update the previous local reference range with the reconstructed samples in the reconstructed area. Whether to update the previous local reference range for the IBC mode can be determined based on the indication, in the prediction information, of whether to update the previous local reference range with the reconstructed samples in the reconstructed area. For example, whether to update the previous local reference range with the reconstructed samples in the reconstructed area is indicated by a flag included in the prediction information of the area. Whether to update the previous local reference range for the IBC mode can be determined based on the flag. In an example, the flag is signaled in the coded video bitstream.

In an example, a separate flag is signaled for each area that has the size of the memory update area unit, such as 64×64. In an example, a separate flag is signaled for each CB.

A separate flag can be signaled for each superblock or each CTB. In an example, the flag indicates whether any reconstructed sample(s) in the block (e.g., the superblock or the CTB) are to be used in updating the local reference range in the IBC mode. Therefore, a single flag (e.g., the flag) can be used to indicate whether reconstructed samples in multiple areas in the block (e.g., the superblock or the CTB) are to be used in updating the local reference range in the IBC mode. In an example, each of the multiple areas is a CB or a portion of a CB. In an example, a size of each of the multiple areas is the size of the memory update area unit, such as 64×64.

In response to a determination not to update the previous local reference range for the IBC mode, the process (1900) proceeds to (S1930). Otherwise, in response to a determination to update the previous local reference range for the IBC mode, the process (1900) proceeds to a branch including (S1940) and (S1950).

At (S1930), the previous local reference range for the IBC mode is determined not to be updated. Accordingly, the previous local reference range for the IBC mode is not updated. A coding block (CB) in the current picture can be decoded using the IBC mode that is based on the previous local reference range, which does not include the reconstructed area. In an example, the CB is in the superblock or the CTB.

After (S1930), the process (1900) proceeds to (S1999), and terminates.

In the branch including (S1940) and (S1950), the previous local reference range for the IBC mode is determined to be updated.

At (S1940), a current local reference range can be generated based on the previous local reference range and reconstructed samples in the reconstructed area.

The previous local reference range can include multiple areas stored in a reference sample memory (RSM). The current local reference range can be generated by replacing reference samples in one of the multiple areas in the previous local reference range with the reconstructed samples in the reconstructed area.

In some embodiments, which one of the multiple areas in the previous local reference range is to be replaced is determined based on a ranking of the multiple areas. Accordingly, an area in the multiple areas to be replaced by the reconstructed samples in the reconstructed area can be selected based on the ranking of the multiple areas. The current local reference range can be generated by replacing the selected area in the previous local reference range with the reconstructed samples in the reconstructed area.

In some examples, the multiple areas are ranked based on contents of the multiple areas. Each of the contents can correspond to a respective one of the multiple areas. In an example, each of the contents corresponding to the respective one of the multiple areas is indicated by a percentage of a screen content or a percentage of a texture content in the corresponding area, and the multiple areas are ranked based on the respective percentages of the screen contents or the respective percentages of the texture contents of the multiple areas.

In some examples, each area of the multiple areas includes a number of specially coded reference samples in the respective area that are coded with one or more prediction modes in a set of pre-defined prediction modes. The multiple areas can be ranked based on the respective numbers of specially coded reference samples in the multiple areas.

In some examples, a reference frequency associated with each area of the multiple areas indicates a number of times that the respective area is referenced by block vectors used to predict CBs in the current picture or a portion in the current picture. The multiple areas can be ranked based on the respective reference frequencies of the multiple areas.

At (S1950), the CB in the current picture can be decoded using the IBC mode that is based on the current local reference range, which includes the reconstructed area.

After (S1950), the process (1900) proceeds to (S1999), and terminates.

The process (1900) can be suitably adapted to various scenarios and steps in the process (1900) can be adjusted accordingly. One or more of the steps in the process (1900) can be adapted, omitted, repeated, and/or combined. Any suitable order can be used to implement the process (1900). Additional step(s) can be added.

In an example, the previous local reference range includes multiple areas. Reconstructed samples of the multiple areas except reconstructed samples of a sub-area in one of the multiple areas are stored in the RSM. The reconstructed samples of the sub-area in the one of the multiple areas are replaced by a padding process that stores padded samples corresponding to the sub-area in the one of the multiple areas in the RSM.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above can be implemented as computer software using computer-readable instructions and physically stored in one or more computer-readable media. For example, FIG. 20 shows a computer system (2000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 20:
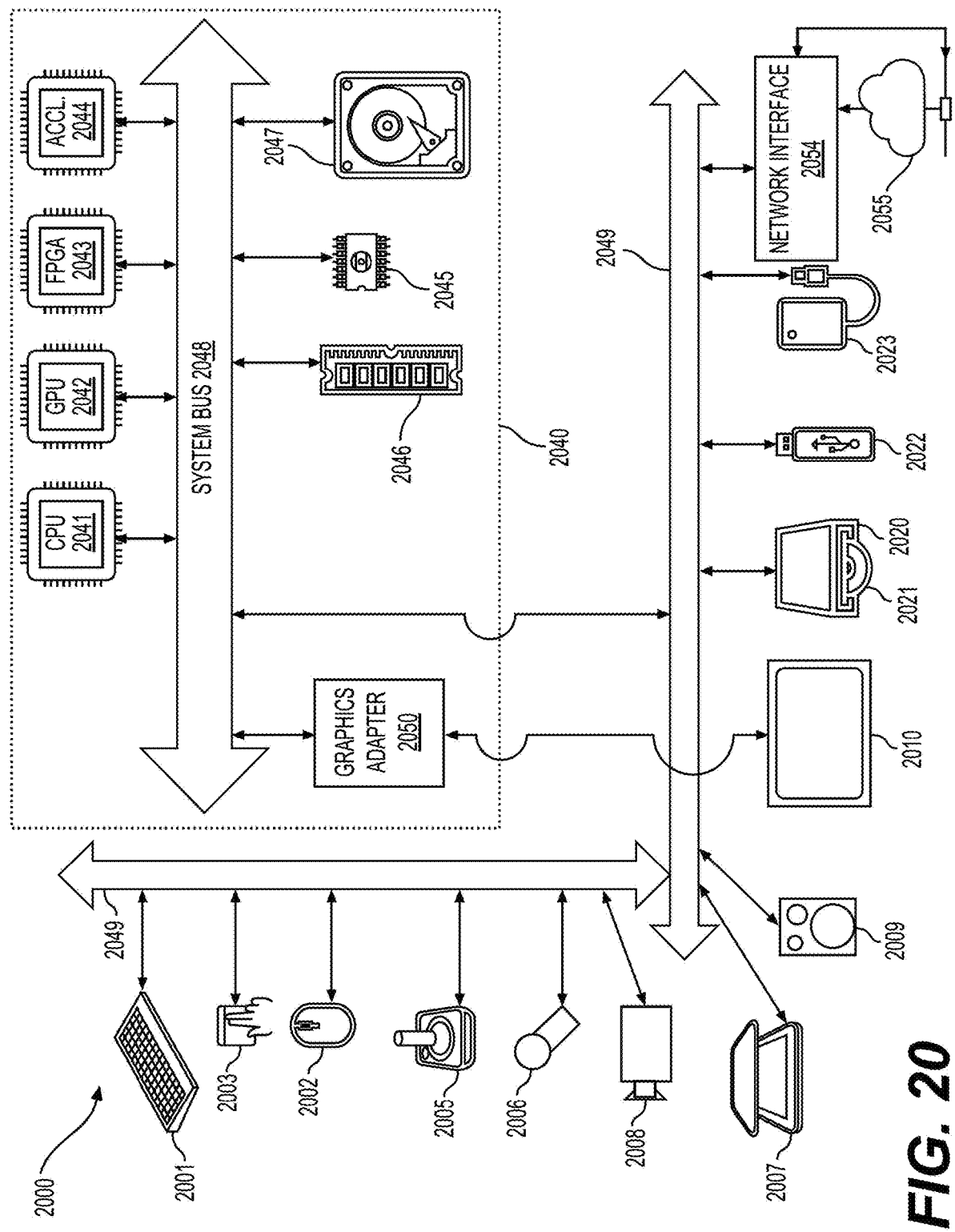
FIG. 20 is a schematic illustration of a computer system in accordance with an embodiment.

The components shown in FIG. 20 for computer system (2000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2000).

Computer system (2000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2001), mouse (2002), trackpad (2003), touch-screen (2010), data-glove (not shown), joystick (2005), microphone (2006), scanner (2007), camera (2008).

Computer system (2000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2010), data-glove (not shown), or joystick (2005), but there can also be tactile feedback devices that do not serve as input devices), audio output devices (such as: speakers (2009), headphones (not depicted)), visual output devices (such as screens (2010) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2000) can also include human accessible storage devices and their associated media such as optical media including CD/DVD ROM/RW (2020) with CD/DVD or the like media (2021), thumb-drive (2022), removable hard drive or solid state drive (2023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2000) can also include an interface (2054) to one or more communication networks (2055). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2049) (such as, for example USB ports of the computer system (2000)); others are commonly integrated into the core of the computer system (2000) by attachment to a system bus as described below (for example Ethernet interface into a PC computer system or cellular network interface into a smartphone computer system). Using any of these networks, computer system (2000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2040) of the computer system (2000).

The core (2040) can include one or more Central Processing Units (CPU) (2041), Graphics Processing Units (GPU) (2042), specialized programmable processing units in the form of Field Programmable Gate Areas (FPGA) (2043), hardware accelerators (2044) for certain tasks, graphics adapters (2050), and so forth. These devices, along with Read-only memory (ROM) (2045), Random-access memory (2046), internal mass storage (2047) such as internal non-user accessible hard drives, SSDs, and the like, may be connected through a system bus (2048). In some computer systems, the system bus (2048) can be accessible in the form of one or more physical plugs to enable extensions by additional CPUs, GPU, and the like. The peripheral devices can be attached either directly to the core's system bus (2048), or through a peripheral bus (2049). In an example, the screen (2010) can be connected to the graphics adapter (2050). Architectures for a peripheral bus include PCI, USB, and the like.

CPUs (2041), GPUs (2042), FPGAs (2043), and accelerators (2044) can execute certain instructions that, in combination, can make up the aforementioned computer code. That computer code can be stored in ROM (2045) or RAM (2046). Transitional data can be stored in RAM (2046), whereas permanent data can be stored for example, in the internal mass storage (2047). Fast storage and retrieve to any of the memory devices can be enabled through the use of cache memory, that can be closely associated with one or more CPU (2041), GPU (2042), mass storage (2047), ROM (2045), RAM (2046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2000), and specifically the core (2040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2040) that are of non-transitory nature, such as core-internal mass storage (2047) or ROM (2045). The software implementing various embodiments of the present disclosure can be stored in such devices and executed by core (2040). A computer-readable medium can include one or more memory devices or chips, according to particular needs. The software can cause the core (2040) and specifically the processors therein (including CPU, GPU, FPGA, and the like) to execute particular processes or particular parts of particular processes described herein, including defining data structures stored in RAM (2046) and modifying such data structures according to the processes defined by the software. In addition or as an alternative, the computer system can provide functionality as a result of logic hardwired or otherwise embodied in a circuit (for example: accelerator (2044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
R-D: Rate-Distortion While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding, comprising:
reconstructing an area in a current picture from a coded video bitstream, the area including one or more coding blocks (CBs) in the current picture;
determining a content of the reconstructed area based on reconstructed samples in the reconstructed area, the content of the reconstructed area indicating a percentage of a predefined type of content in the reconstructed area;
determining whether to update a previous local reference search range for an intra block copy (IBC) mode based on the percentage of the predefined type of content in the reconstructed area; and
when the previous local reference search range for the IBC mode is determined not to be updated with the reconstructed samples in the reconstructed area,
decoding a coding block (CB) in the current picture using the IBC mode that is based on the previous local reference search range that does not include the reconstructed area.

2. The method of claim 1, wherein
the content of the reconstructed area includes no screen content; and
the determining whether to update the previous local reference search range includes determining that the previous local reference search range for the IBC mode is not to be updated.

3. The method of claim 1, wherein the determining whether to update the previous local reference search range further comprises:
decoding prediction information of the area, the prediction information indicating a prediction mode of the area; and
determining whether to update the previous local reference search range for the IBC mode based on the percentage of the predefined type of content in the reconstructed area and the prediction mode.

4. The method of claim 1, wherein
the previous local reference search range for the IBC mode is determined to be updated;
the previous local reference search range includes multiple areas stored in a reference sample memory (RSM), the multiple areas including reference samples; and
the method further includes:
ranking the multiple areas based on contents of the multiple areas, each of the contents corresponding to a respective one of the multiple areas;
selecting an area in the multiple areas that is to be replaced by the reconstructed samples in the reconstructed area based on the ranking of the multiple areas; and
generating a current local reference search range by replacing the selected area in the previous local reference search range with the reconstructed samples in the reconstructed area.

5. The method of claim 4, wherein
each of the contents corresponding to the respective one of the multiple areas is indicated by a percentage of a predefined type of content in the corresponding area; and
the ranking the multiple areas includes ranking the multiple areas based on the respective percentages of the type of content of the multiple areas.

6. The method of claim 1, wherein
the previous local reference search range for the IBC mode is determined to be updated;
the previous local reference search range includes multiple areas stored in a reference sample memory (RSM);
each area of the multiple areas includes a number of reference samples in the respective area that are coded with one or more prediction modes in a set of predefined prediction modes; and
the method further includes:
ranking the multiple areas based on the respective numbers of reference samples in the multiple areas;
selecting an area in the multiple areas that is to be replaced by the reconstructed samples in the reconstructed area based on the ranking of the multiple areas; and
generating a current local reference search range by replacing the selected area in the previous local reference search range with the reconstructed samples in the reconstructed area.

7. The method of claim 1, wherein
the previous local reference search range for the IBC mode is determined to be updated;
the previous local reference search range includes multiple areas stored in a reference sample memory (RSM);
a reference frequency associated with each area of the multiple areas indicates a number of times that the respective area is referenced by block vectors used to predict CBs in the current picture; and the method further includes:
- ranking the multiple areas based on the respective reference frequencies of the multiple areas;
- selecting an area in the multiple areas that is to be replaced by the reconstructed samples in the reconstructed area based on the ranking of the multiple areas; and
- generating a current local reference search range by replacing the selected area in the previous local reference search range with the reconstructed samples in the reconstructed area.

8. The method of claim 1, wherein
the previous local reference search range includes multiple areas;
reconstructed samples of the multiple areas except reconstructed samples of a sub-area in one of the multiple areas are stored in a reference sample memory (RSM); and
the reconstructed samples of the sub-area in the one of the multiple areas are replaced by a padding process that stores padded samples corresponding to the sub-area in the one of the multiple areas in the RSM.

9. The method of claim 1, wherein
the reconstructed area is a reconstructed coding block, or a size of the reconstructed area is a size of a memory update area unit.

10. A method for video encoding, comprising:
- determining a content of a reconstructed area based on reconstructed samples in the reconstructed area, the content of the reconstructed area indicating a percentage of a predefined type of content in the reconstructed area, the reconstructed area including one or more coding blocks (CBs) in a current picture;
- determining whether to update a previous local reference search range for an intra block copy (IBC) mode based on the percentage of the predefined type of content in the reconstructed area; and
- when the previous local reference search range for the IBC mode is determined not to be updated with the reconstructed samples in the reconstructed area,
  - encoding a coding block (CB) in the current picture in a coded video bitstream using the IBC mode that is based on the previous local reference search range that does not include the reconstructed area.

11. The method of claim 10, wherein
the content of the reconstructed area includes no screen content; and
the determining whether to update the previous local reference search range includes determining that the previous local reference search range for the IBC mode is not to be updated.

12. The method of claim 10, wherein the determining whether to update the previous local reference search range further comprises:
- decoding prediction information of the reconstructed area, the prediction information indicating a prediction mode of the reconstructed area; and
- determining whether to update the previous local reference search range for the IBC mode based on the percentage of the predefined type of content in the reconstructed area and the prediction mode.

13. A method of processing video data, the method comprising:
- processing a coded video bitstream of the video data, wherein the coded video bitstream causes a decoder to:
  - reconstruct an area in a current picture from the coded video bitstream, the area including one or more coding blocks (CBs) in the current picture;
  - determine a content of the reconstructed area based on reconstructed samples in the reconstructed area, the content of the reconstructed area indicating a percentage of a predefined type of content in the reconstructed area;
  - determine whether to update a previous local reference search range for an intra block copy (IBC) mode based on the percentage of the predefined type of content in the reconstructed area; and
  - when the previous local reference search range for the IBC mode is determined not to be updated with the reconstructed samples in the reconstructed area, decode a coding block (CB) in the current picture using the IBC mode that is based on the previous local reference search range that does not include the reconstructed area.

\* \* \* \* \*